United States Patent
Huang et al.

(10) Patent No.: US 11,550,111 B2
(45) Date of Patent: Jan. 10, 2023

(54) OPTICAL ELEMENT DRIVING MECHANISM

(71) Applicant: TDK TAIWAN CORP., Taoyuan (TW)

(72) Inventors: Wen-Yen Huang, Taoyuan (TW); Yung-Ping Yang, Taoyuan (TW); Sin-Hong Lin, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 259 days.

(21) Appl. No.: 16/875,032

(22) Filed: May 15, 2020

(65) Prior Publication Data

US 2020/0363602 A1 Nov. 19, 2020

Related U.S. Application Data

(60) Provisional application No. 62/882,165, filed on Aug. 2, 2019, provisional application No. 62/849,317, filed on May 17, 2019.

(51) Int. Cl.
*G02B 7/04* (2021.01)
*G02B 7/00* (2021.01)
*G02B 7/10* (2021.01)

(52) U.S. Cl.
CPC .............. *G02B 7/005* (2013.01); *G02B 7/10* (2013.01)

(58) Field of Classification Search
CPC .............. G02B 7/04; G02B 7/09; G02B 7/10
See application file for complete search history.

(56) References Cited

U.S. PATENT DOCUMENTS

2018/0252893 A1* 9/2018 Park .................... G03B 3/10

* cited by examiner

*Primary Examiner* — Joseph P Martinez
(74) *Attorney, Agent, or Firm* — Muncy, Geissler, Olds & Lowe, P.C.

(57) ABSTRACT

An optical element driving mechanism is provided. The optical element driving mechanism includes an immovable part, a movable part, a driving assembly, and a sensing assembly. The movable part is connected to an optical element including an optical axis. The movable part is movable relative to the immovable part. The driving assembly drives the movable part to move relative to the immovable part. The sensing assembly senses the movement of the movable part relative to the immovable part.

20 Claims, 32 Drawing Sheets

OPTICAL ELEMENT DRIVING MECHANISM

CROSS-REFERENCE TO RELATED APPLICATIONS

The present application claims priority of U.S. Provisional Patent Application No. 62/849,317 filed on May 17, 2019 and U.S. Provisional Patent Application No. 62/882,165 filed on Aug. 2, 2019, which are incorporated by reference herein in their entirety.

BACKGROUND OF THE DISCLOSURE

Field of the Disclosure

The present disclosure relates to a driving mechanism, and more particularly to an optical element driving mechanism.

Description of the Related Art

As technology has developed, optical elements and optical element driving mechanisms for driving optical elements are miniaturized. Equipped with optical elements, optical element driving mechanisms, and light-detection elements, many electronic devices (such as a tablet computer, a smartphone, etc.) are able to capture images and record video.

When a user uses an electronic device, shock and vibration may occur, which may cause the image or video to come out blurry. However, as the demand for higher quality in images or video is increasing, optical element driving mechanisms that are able to compensate for shock or vibration are produced.

An optical element driving mechanism may drive an optical element to move along the optical axis to focus on the object, thereby achieving auto focus (AF) and enhancing the quality in images.

Nowadays, an optical element driving mechanism may additionally include a sensing assembly, and the driving signals are corrected according to the position of the optical element that is sensed by the sensing assembly to achieve closed-loop feedback. Therefore, configuration and design of the sensing assembly are extremely important.

BRIEF SUMMARY OF THE DISCLOSURE

According to some embodiments of the disclosure, an optical element driving mechanism is provided. The optical element driving mechanism includes an immovable part, a movable part, a driving assembly, and a sensing assembly. The movable part is connected to an optical element including an optical axis. The movable part is movable relative to the immovable part. The driving assembly drives the movable part to move relative to the immovable part. The sensing assembly senses the movement of the movable part relative to the immovable part.

According to some embodiments, the immovable part includes a bottom. The bottom includes a base plate and a first stage. The base plate extends in a direction that is perpendicular to the optical axis. The base plate includes an opening. The optical axis passes through the opening. The first stage is disposed on the base plate. The sensing assembly includes a reference element and a sensing element. The reference element includes a plurality of magnetic poles. The sensing element corresponds to the reference element. The sensing element is disposed on the bottom. The size of the first stage in the optical axis is larger than the size of the sensing element in the optical axis.

The optical element driving mechanism further includes an elastic element. The movable part is movably connected to the immovable part via the elastic element. The elastic element does not overlap the sensing element when viewed along the optical axis. Part of the elastic element is disposed on the first stage. The driving assembly drives the movable part to move in a first direction relative to the immovable part within a range of movement, and when the movable part is within the range of movement, the reference element does not overlap the sensing element within the range of movement when viewed in a second direction that is perpendicular to the first direction. The bottom further includes a second stage disposed on the base plate, the second stage is closer to the sensing element than the first stage, and a maximum size of the first stage in the optical axis is different from a maximum size of the second stage in the optical axis. The bottom further includes a stopping portion, and the size of the stopping portion in the optical axis is between the size of the first stage in the optical axis and the size of the second stage in the optical axis. The sensing element does not protrude from the second stage when viewed in a direction that is perpendicular to the optical axis. The maximum size of the sensing element in the optical axis is larger than the maximum size of the second stage in the optical axis. The bottom further includes a recess formed on the second stage, and the sensing element is disposed in the recess.

The optical element driving mechanism further includes an adhesion element. The bottom further includes a concave hole formed on the recess, the adhesion element flows to the recess via the concave hole, and the adhesion element does not flow to the second stage. The optical element driving mechanism further includes a circuit assembly, the circuit assembly includes an embedded portion and a revealed portion, the embedded portion is not revealed from the bottom, and the revealed portion is electrically connected to the sensing element. The base plate further includes an inner surface close to the opening and an outer surface located on an outer periphery of the base plate, and part of the revealed portion of the circuit assembly is revealed from the inner surface and the outer surface. The bottom further includes a trench receiving part of the revealed portion of the circuit assembly.

The optical element driving mechanism further includes an electrical connection element. The electrical connection element is disposed on the elastic element, so that the elastic element is electrically connected to the circuit assembly. The sensing element is disposed on a first corner of the bottom while the electrical connection element is not disposed on the first corner. The circuit assembly surrounds the opening of the base plate when viewed along the optical axis. The circuit assembly includes a first segment and a second segment located on different sides of the sensing element, part of the first segment surrounds the opening of the base plate corresponds to an arc when viewed along the optical axis, and the arc is greater than 180°.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

The First Embodiment Group

Figure 1:
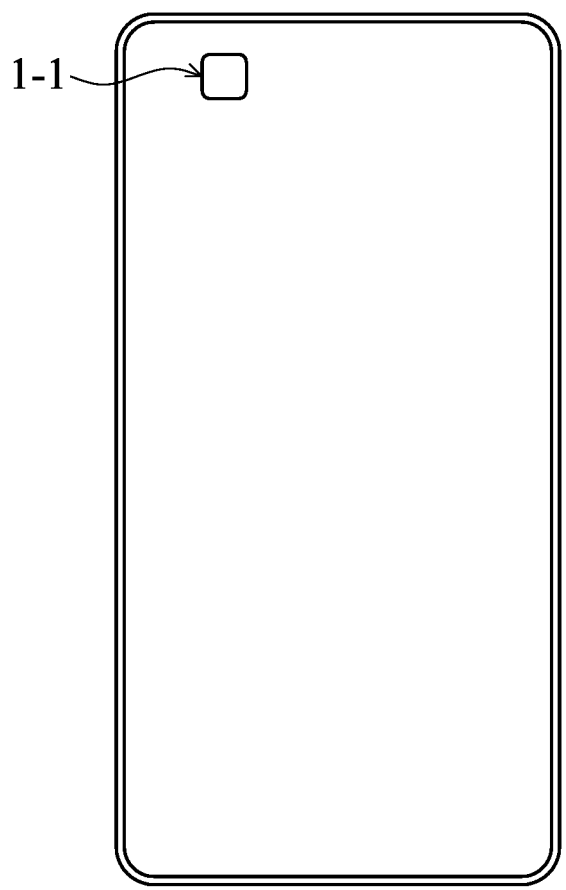
FIG. 1 is a schematic view of an electronic device and an optical element driving mechanism.

FIG. 1 is a schematic view of an electronic device 1-200 and an optical element driving mechanism 1-1. The electronic device 1-200 may be a smart phone, a tablet computer, etc. The optical element driving mechanism 1-1 is generally disposed on the top region of the electronic device 1-200 to avoid blocking the display screen of the electronic device 1-200.

Figure 2:
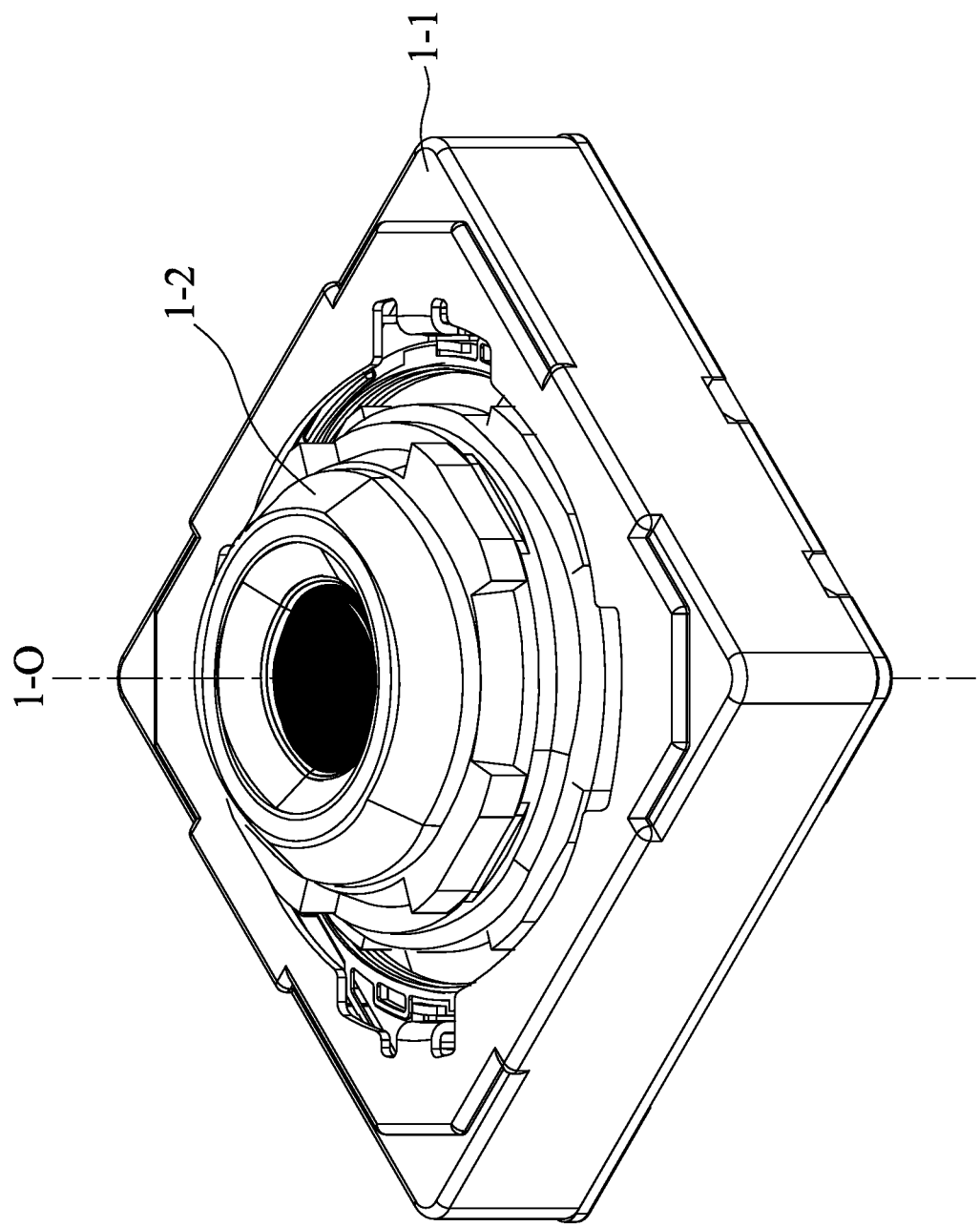
FIG. 2 is a perspective view of the optical element driving mechanism and an optical element.

FIG. 2 is perspective view of the optical element driving mechanism 1-1 and an optical element 1-2 in accordance with some embodiments of this disclosure. In order to capture clear images, the optical element driving mechanism 1-1 may drive the optical element 1-2 to move, so that the position of the optical element 1-2 is adjusted. In this technical field, the optical element driving mechanism 1-1 may be referred to as a voice coil motor (VCM). The optical element 1-2 may be a camera lens, such as a lens. The optical element 1-2 may be made of plastic or glass. The optical element 1-2 has an optical axis 1-O. The optical axis 1-O is an imaginary axis that passes through the center of the optical element 1-2.

Figure 3:
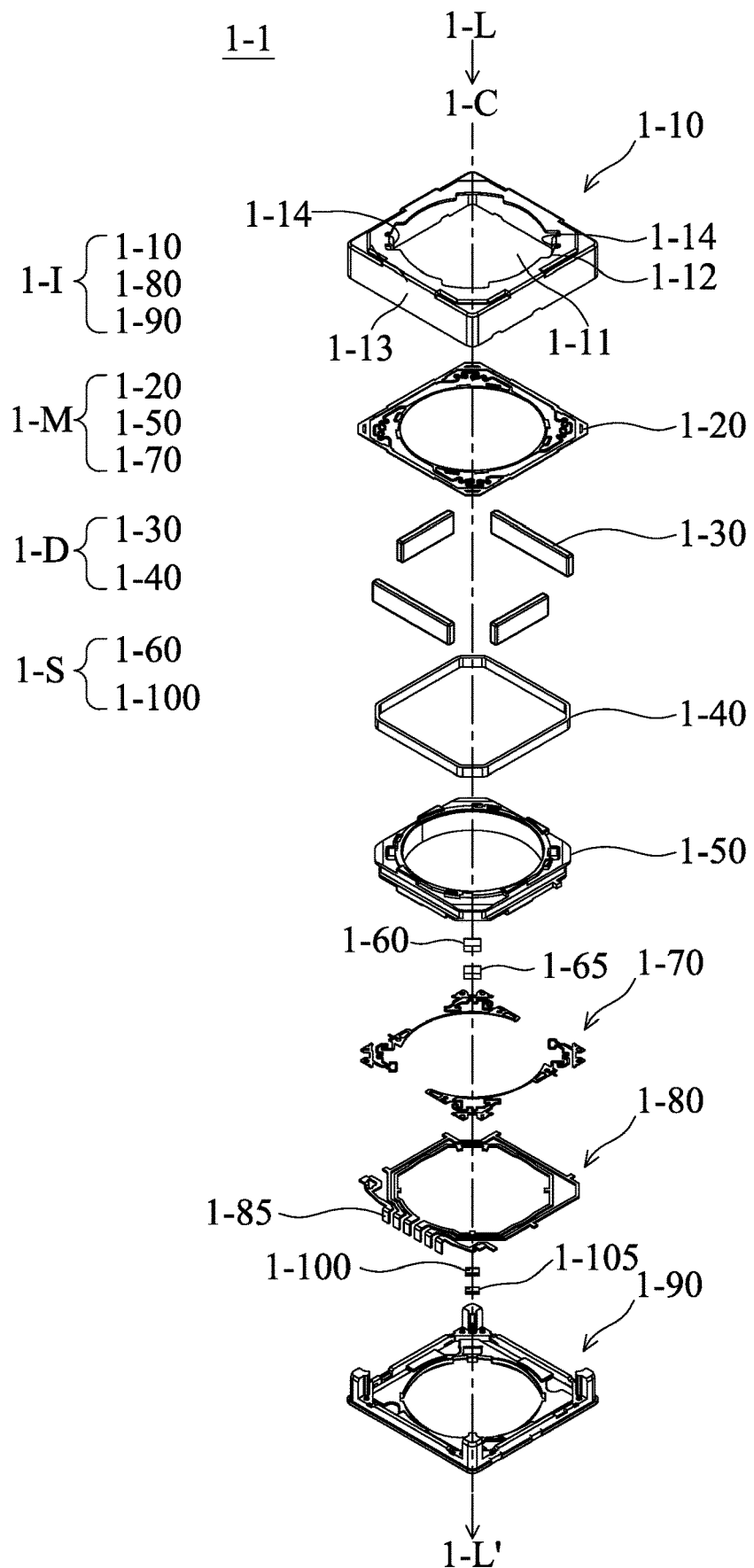
FIG. 3 is an exploded view of the optical element driving mechanism.

FIG. 3 is an exploded view of the optical element driving mechanism 1-1. The optical element driving mechanism 1-1 includes an immovable part 1-I, a movable part 1-M, a driving assembly 1-D, and a sensing assembly 1-S. The movable part 1-M connects to the optical element 1-2. The movable part 1-M is movable relative to the immovable part 1-I. The driving assembly 1-D drives the movable part 1-M to move relative to the immovable part 1-I. The sensing assembly 1-S senses the movement of the movable part 1-M relative to the immovable part 1-I.

The optical element driving mechanism 1-1 has a central axis 1-C that passes through the center of the optical element driving mechanism 1-1. It should be noted that when the optical element 1-2, the optical element driving mechanism 1-1 and a light-detection element (not shown) (e.g. a charge-coupled detector, CCD) are aligned, the optical axis 1-O of the optical element 1-2 also passes through the center of the optical element driving mechanism 1-1, so that the optical axis 1-O of the optical element 1-2 coincides with the central axis 1-C of the immovable part 1-I.

However, movement, vibration, rotation, or tilt of the movable part 1-M may cause the optical axis 1-O of the optical element 1-2 to not coincide with the central axis 1-C of the immovable part 1-I because the optical element 1-2 is disposed in the movable part 1-M. In the specification and the accompanying drawings, either the optical axis 1-O or the central axis 1-C is used to help to describe the feature of the optical element driving mechanism 1-1.

In this embodiment, the immovable part 1-I includes a case 1-10, a circuit assembly 1-80, and a bottom 1-90. The movable part 1-M includes a first elastic element 1-20, a holder 1-50, and two second elastic elements 1-70. The driving assembly 1-D includes four magnetic elements 1-30 and a coil 1-40. The sensing assembly 1-S includes a reference element 1-60 and a sensing element 1-100. It should be noted that the elements may be added or omitted according to the requirements of the users.

Figure 4:
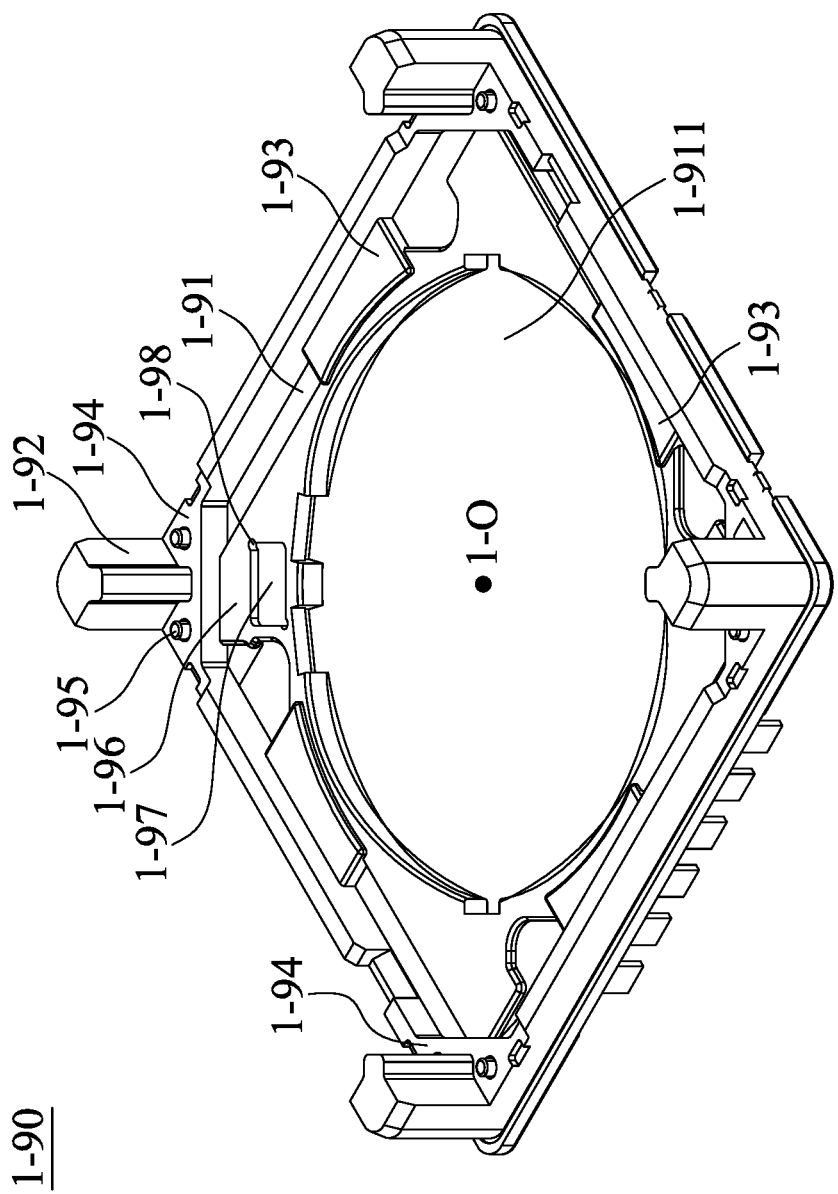
FIG. 4 is a perspective view of a bottom.
Figure 5:
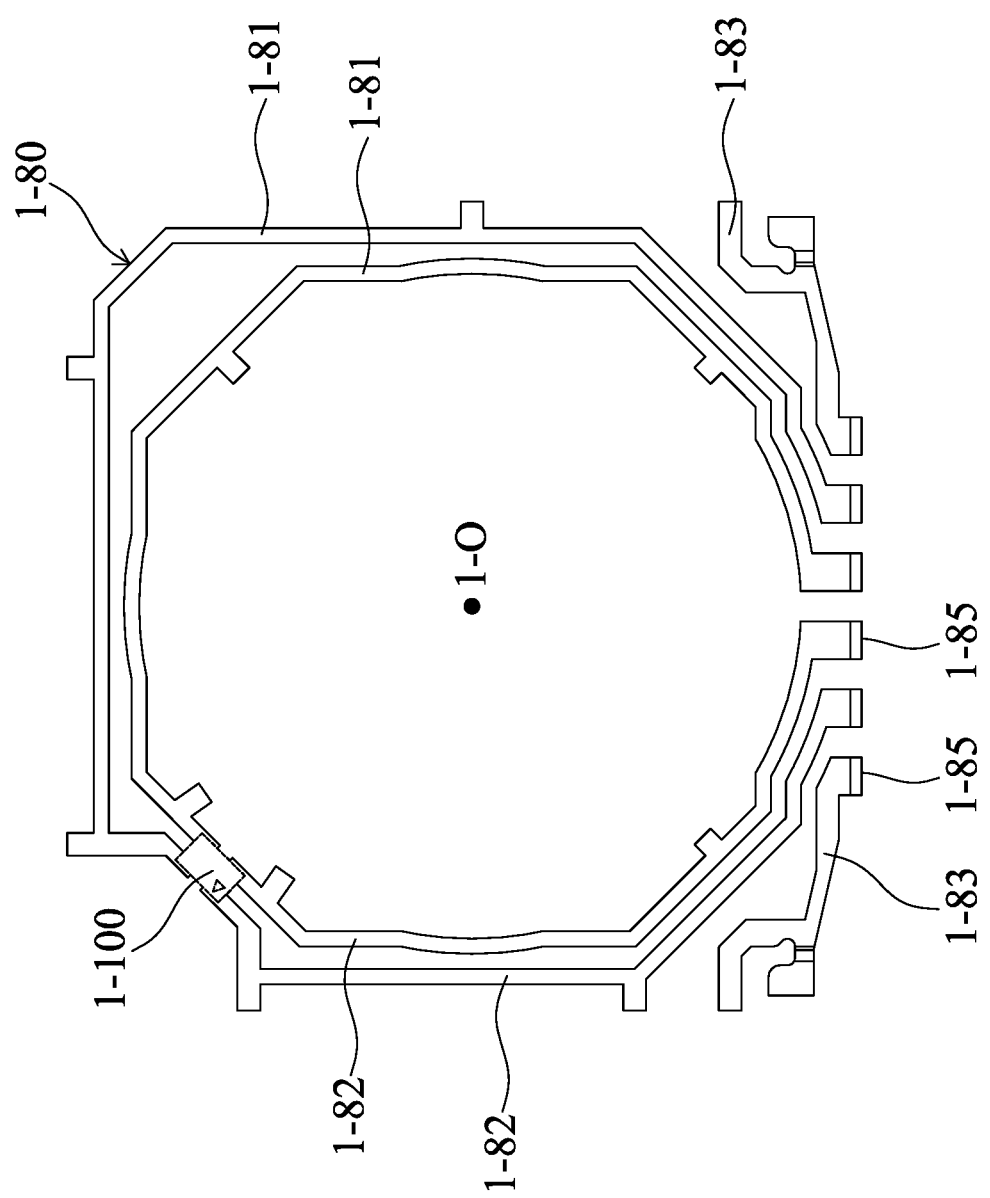
FIG. 5 is a top view of a circuit assembly and a sensing element.
Figure 6:
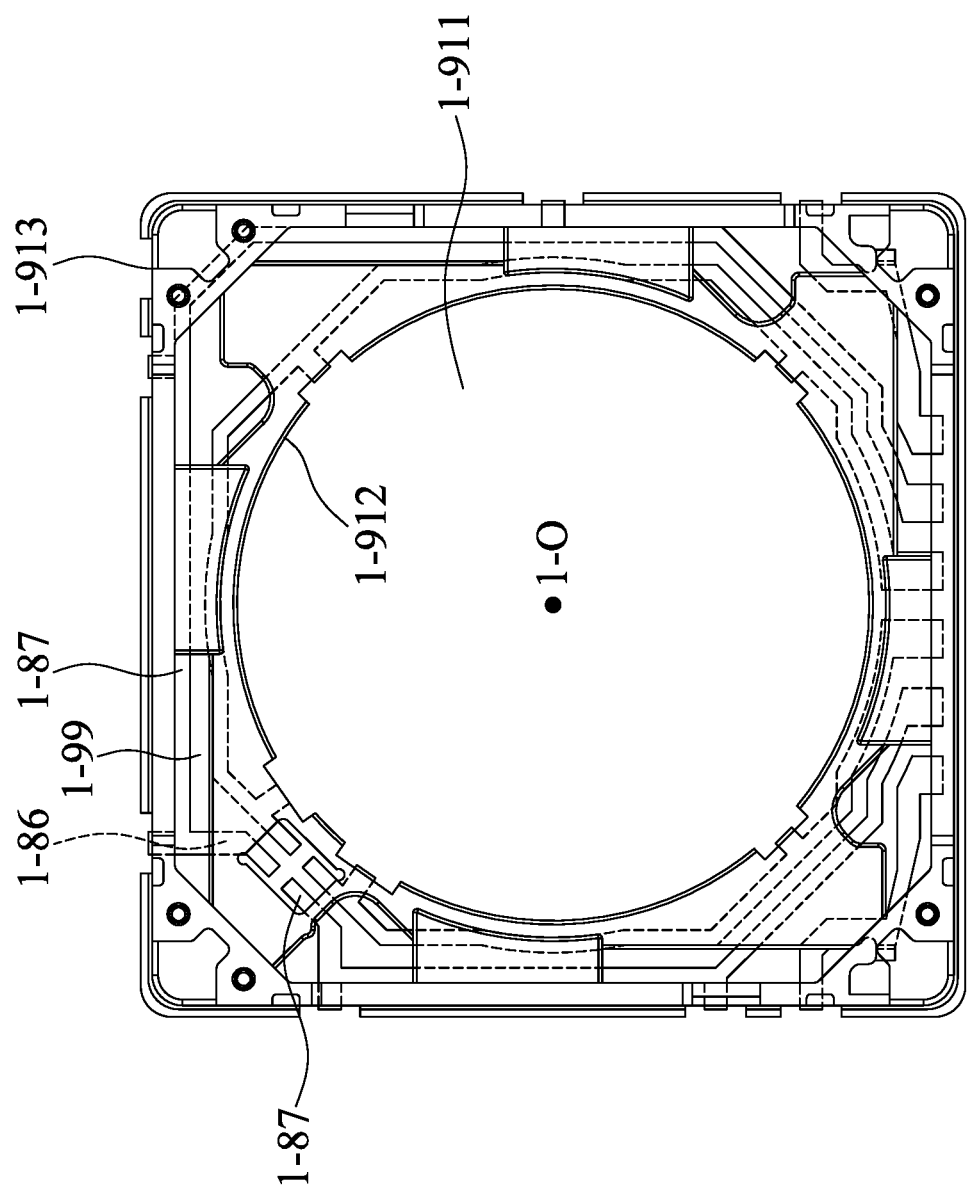
FIG. 6 is a top view of the circuit assembly and the bottom.

Please also refer to FIG. 4 to FIG. 6 to understand the immovable part 1-I. FIG. 4 is a perspective view of the bottom 1-90. FIG. 5 is a top view of the circuit assembly 1-80 and the sensing element 1-100. FIG. 6 is a top view of the circuit assembly 1-80 and the bottom 1-90. The case 1-10 and the bottom 1-90 are arranged along the central axis 1-C. The case 1-10 is disposed over the circuit assembly 1-80 and the bottom 1-90.

The case 1-10 may be made of metal material or non-metal material such as plastics. The case 1-10 made of non-metal material may isolate electromagnetic wave. In this way, the electromagnetic wave interference generated by an antenna close to the optical element driving mechanism 1-1 may be reduced. The case 1-10 is connected to the bottom 1-90 via adhesion, welding, etc. After the case 1-10 is connected to the bottom 1-90, the space formed therein may accommodate the movable part 1-M, the driving assembly 1-D, and the sensing assembly 1-S, and the like.

The case 1-10 includes an opening 1-11, a top wall 1-12, four sidewalls 1-13, and two rotation-proof structures 1-14. An entering light 1-L outside the optical element driving mechanism 1-1 enters the optical element driving mechanism 1-1 via the opening 1-11. The top wall 1-12 is perpendicular to the central axis 1-C, and the top wall 1-12 may not be entirely planar. Each sidewall 1-13 extends from the outer edge (far away from the central axis 1-C) of the top wall 1-12 along the central axis 1-C. Each rotation-proof structure 1-14 extends from the inner edge (close to the central axis 1-C) of the top wall 1-12 along the central axis 1-C. The two rotation-proof structures 1-14 are located on the diagonal of the case 1-10 and may restrict the range of rotation of the holder 1-50. When the holder 1-50 rotates to a certain degree, the holder 1-50 is in contact with one of the rotation-proof structures 1-14, and thus the holder 1-50 cannot keep rotating.

As shown in FIG. 4, the bottom 1-90 includes a base plate 1-91, four pillars 1-92, at least one stopping portion 1-93, at least one first stage 1-94, at least one connection portion 1-95, at least one second stage 1-96, and at least one recess 1-97. The base plate 1-91 is defined as the plane of the part of the bottom 1-90 that is the most farther away from the top wall 1-12 in the central axis 1-C. The base plate 1-91 extends in a direction that is perpendicular to the optical axis 1-O. The base plate 1-91 includes an opening 1-911. The entering light 1-L leaves the optical element driving mechanism 1-1 via the opening 1-911 and becomes an exit light 1-L'. That is, the optical axis 1-O passes through the opening 1-911.

The pillars 1-92 are disposed on the corners of the base plate 1-91. The height of the pillars 1-92 are higher than the rest parts of the bottom 1-90. That is, the pillars 1-92 are closer to the top wall 1-12 than the rest parts of the bottom 1-90. The outer surface (far away from the central axis 1-C) of the pillars 1-92 may be in contact with the sidewalls 1-13 to increase the contact area between the case 1-10 and the bottom 1-90, thereby prevent the case 1-10 from disconnection.

In some embodiments, the optical element driving mechanism 1-1 further includes a damping element (not shown) disposed between the holder 1-50 and the pillar 1-92. The damping element is made of material that may absorb shock and may inhibit vibration, such as a gel. The pillar 1-92 may include a step-like shape to avoid the flow of the damping element. When the optical element driving mechanism 1-1 is impacted by an external force, the damping element may prevent a severe collision between the movable part 1-M and the immovable part 1-I. Furthermore, the damping element may help the holder 1-50 to return to its original position quickly when it is impacted and may prevent the optical element 1-2 in the holder 1-50 from being unstable. Therefore, the damping element may improve the reaction time and the accuracy of the holder 1-50 during its movement.

The stopping portion 1-93 is disposed around the base plate 1-91. The height of the stopping portion 1-93 is lower than the pillars 1-92 and the first stage 1-94, but is slightly higher than the second stage 1-96. That is, the size of the stopping portion 1-93 in the optical axis 1-O is between the size of the first stage 1-94 in the optical axis 1-O and the size of the second stage 1-96 in the optical axis 1-O. The stopping portion 1-93 may restrict the range of movement of the holder 1-50. When the holder 1-50 reaches the limit, the holder 1-50 is in contact with the stopping portion 1-93, so that the holder 1-50 may not keep moving toward the bottom 1-90.

The first stage 1-94 is disposed on the corner of the base plate 1-91 and is close to the pillar 1-92. Among the elements of the bottom 1-90, the height of the first stage 1-94 is second to the pillar 1-92. The connection portion 1-95 is disposed on the first stage 1-94. The connection portion 1-95 may be a protrusion. Part of the second elastic element 1-70 is immovably disposed on the first stage 1-94. The connection portion 1-95 may strengthen the connection between the second elastic element 1-70 and the first stage 1-94 of the bottom 1-90.

The second stage 1-96 is disposed on the base plate 1-91. The height of the second stage 1-96 is lower than the pillar 1-92, the first stage 1-94, and the stopping portion 1-93, but is slightly higher than the base plate 1-91. That is, the maximum size of the first stage 1-94 in the optical axis 1-O is different from the maximum size of the second stage 1-96 in the optical axis 1-O.

The recess 1-97 is formed on the second stage 1-96. The sensing element 1-100 is disposed on the recess 1-97 via surface mount technology (SMT) or other suitable methods. In some embodiments, the bottom 1-90 further includes a concave hole 1-98 (only shown in FIG. 4) formed on the recess 1-97. An adhesion element (not shown) may be disposed in the concave hole 1-98 to strengthen the connection between the sensing element 1-100 and the bottom 1-90. The adhesion element flows to the recess 1-97 via the concave hole 1-98, and the adhesion element does not flow to the second stage 1-96.

The adhesion element may be adhesion material, conductive material, or insulation material, such as resin. Different elements may be adhered to each other by the adhesion element. Furthermore, the adhesion element generally has good elasticity and good covering ability and thus the adhesion element may protect the element(s). Additionally, the adhesion element may reduce the probability of particles such as dust or mist entering the element(s). If the adhesion element is made of insulation material, insulation may be achieved. The steps for applying the adhesion element is generally referred to as "glue dispensing", which may be conducted manually or mechanically.

As shown in FIG. 5 and FIG. 6, part of the circuit assembly 1-80 is formed on the bottom 1-90 by insert molding. The circuit assembly 1-80 is made of metal. The circuit assembly 1-80 substantially surrounds the opening 1-911 of the base plate 1-91. The circuit assembly 1-80 includes at least one first segment 1-81, at least one second segment 1-82, and at least one third segment 1-83. The first segment 1-81 and the second segment 1-82 are in contact with the sensing element 1-100 and are located on the opposite sides of the sensing elements 1-100 while the third segment 1-83 is not in contact with the sensing element 1-100. In this embodiment, the optical element driving mechanism 1-1 includes two first segments 1-81, two second segments 1-82, and two third segments 1-83.

The part that the first segment 1-81 surrounds the opening 1-911 of the base plate 1-91 may correspond to an arc when viewed along the optical axis 1-O or the central axis 1-C. The arc is greater than 180°. Relatively, the arc corresponding to the part that the second segment 1-82 surrounds the opening 1-911 of the base plate 1-91 is less than 180°.

Furthermore, the circuit assembly 1-80 includes a plurality of pins 1-85. In this embodiment, each of the first segment 1-81, the second segment 1-82, and the third segment 1-83 includes two pins 1-85. The current flows into and out of the optical element driving mechanism 1-1 via the pins 1-85. Therefore, the circuit assembly 1-80 is used as the conductive wire of the bottom 1-90. The first segment 1-81 and the second segment 1-82 are electrically connected to the sensing element 1-100. The third segment 1-83 is electrically connected to the second elastic element 1-70.

As shown in FIG. 6, the part that the circuit assembly 1-80 is not revealed from the bottom 1-90 may be referred to as an embedded portion 1-86 (shown in dotted lines), and the part that the circuit assembly 1-80 is revealed from the bottom 1-90 may be referred to as a revealed portion 1-87. The revealed portion 1-87 of the first segment 1-81 and the second segment 1-82 that are revealed from the recess 1-97 of the bottom 1-90 is electrically connected to the sensing element 1-100. In this embodiment, the sensing element 1-100 includes four pins (not shown) to be electrically connected to the four revealed portions 1-87 of the first segment 1-81 and the second segment 1-82 that are revealed from the recess 1-97 of the bottom 1-90.

The base plate 1-91 includes an inner surface 1-912 close to the opening 1-911 and an outer surface 1-913 located on the outer periphery of the base plate 1-91. Part of the revealed portion 1-87 of the circuit assembly 1-80 is revealed from the inner surface 1-912 or the outer surface 1-913. Additionally, the bottom 1-90 may further include a trench 1-99 close to the second stage 1-96 to receive part of the revealed portion 1-87 of the circuit assembly 1-80.

Figure 7:
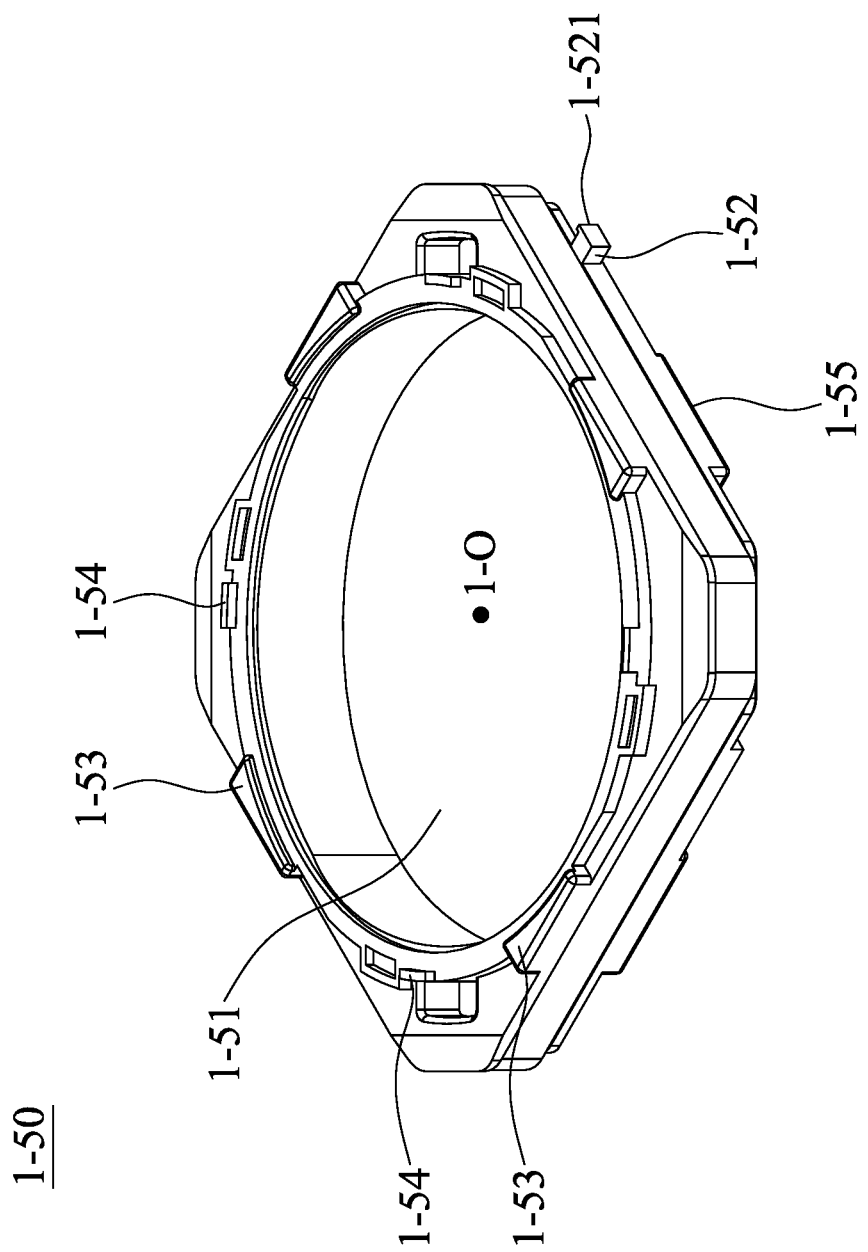
FIG. 7 is a perspective view of the holder.
Figure 8:
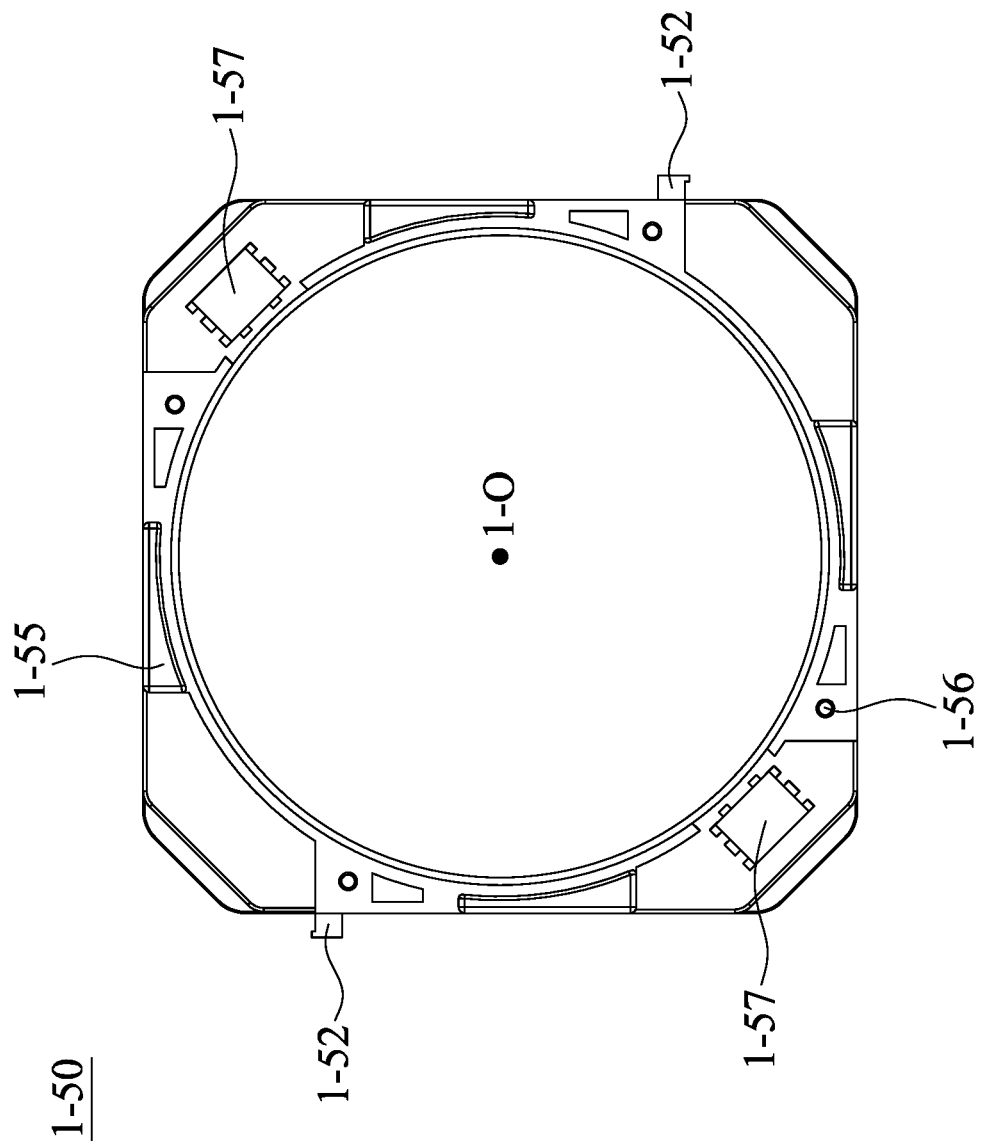
FIG. 8 is a bottom view of the holder.
Figure 9:
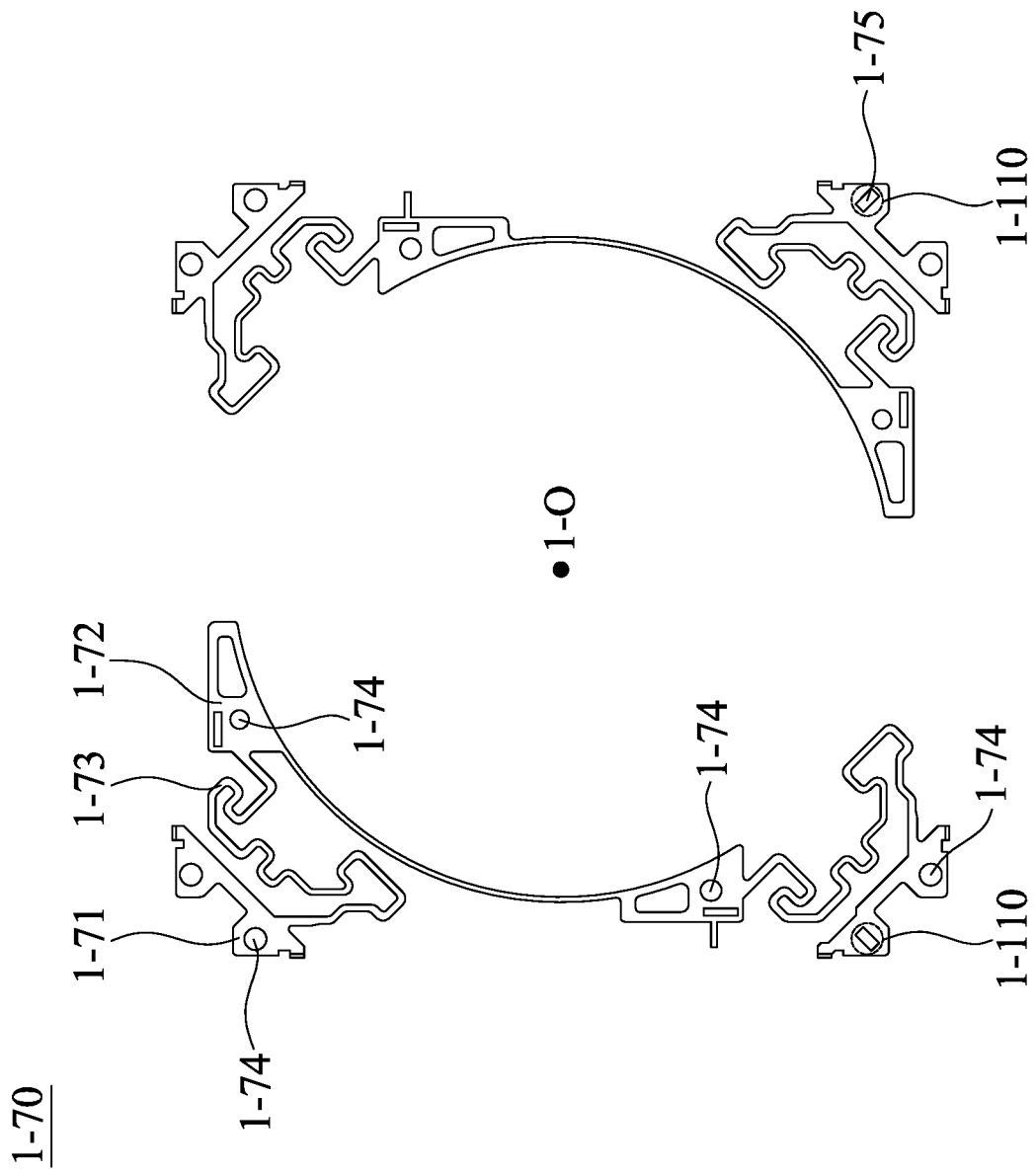
FIG. 9 is a top view of a second elastic element.

Please refer to FIG. 7 to FIG. 9 to understand the movable part 1-M. FIG. 7 is a perspective view of the holder 1-50. FIG. 8 is a bottom view of the holder 1-50. FIG. 9 is a top view of the second elastic element 1-70. The first elastic element 1-20, the holder 1-50, and the second elastic element 1-70 are sequentially arranged along the central axis 1-C.

As shown in FIG. 7 and FIG. 8, the holder 1-50 includes a through hole, at least one winding portion 1-52, at least one upper stopping portion 1-53, at least one upper connection portion 1-54, at least one lower stopping portion 1-55, at least one lower connection portion 1-56, and at least one receiving portion 1-57.

The through hole 1-51 passes through the whole holder 1-50 for holding the optical element 1-2. A screw and its corresponding threaded structure may be configured between the through hole 1-51 and the optical element 1-2, so that the optical element 1-2 may be affixed in the holder 1-50.

In this embodiment, the two winding portions 1-52 are disposed on the opposite sides of the holder 1-50 and extend toward the side walls 13 of the case 1-10. The lead of the coil 1-40 winds around the winding portion 1-52. The coil 1-40 is electrically connected to other elements (e.g. the second elastic element 1-70) via an electrical connection element 1-110 (only shown in FIG. 9). The electrical connection element 1-110 may be any material that may make any elements be electrically connected to other elements, such as metal. According to some embodiments, if the electrical connection element 1-110 is round-shaped, the electrical connection element 1-110 may be disposed on the second elastic element 1-70 more conveniently and more solidly. For example, the electrical connection element 1-110 may be a solder ball.

The winding portion 1-52 is rectangular-shaped when viewed in a direction that is perpendicular to the central axis 1-C to prevent the lead of the coil 1-40 from dropping off. For example, if the winding portion 1-52 is square-shaped, when the movable part 1-M moves, the lead of the coil 1-40 may drop off because it's probable that the lead of the coils 1-40 may rotate. Furthermore, the winding portion 1-52 further includes a projection portion 1-521, which may also prevent the lead of the coil 1-40 from dropping off.

The upper stopping portion 1-53 is disposed around the top surface of the holder 1-50. The top surface of the upper stopping portion 1-53 is the part of the holder 1-50 that is closest to the top wall 1-12 of the case 1-10. The upper stopping portion 1-53 may restrict the range of movement of the holder 1-50. When the holder 1-50 reaches the limit, the upper stopping portion 1-53 may be in contact with the top wall 1-12 of the case 1-10, so that the holder 1-50 may not keep moving toward the top wall 1-12 of the case 1-10. The upper connection portion 1-54 is disposed close to the through hole 1-51. The upper connection portion 1-54 may be a protrusion. Part of the first elastic element 1-20 is immovably disposed on the top surface of the holder 1-50, and the upper connection portion 1-54 may strengthen the connection between the first elastic element 1-20 and the top surface of the holder 1-50.

The lower stopping portion 1-55 is disposed around the bottom surface of the holder 1-50. The bottom surface of the lower stopping portion 1-55 is the part of the holder 1-50 that is closest to the bottom 1-90. The lower stopping portion 1-55 may restrict the range of movement of the holder 1-50. When the holder 1-50 reaches the limit, the lower stopping portion 1-55 may be in contact with the bottom 1-90, so that the holder 1-50 may not keep moving toward the bottom 1-90. In some embodiments, when the holder 1-50 reaches the limit, the lower stopping portion 1-55 is in contact with the stopping portion 1-93 of the bottom 1-90.

The upper stopping portion 1-53 and the lower stopping portion 1-55 of the holder 1-50 and the stopping portion 1-93 of the bottom 1-90 may effectively distribute collision force and enhance the stability of the optical element driving mechanism 1-1. Furthermore, the number and the positions of the upper stopping portion 1-53, the lower stopping portion 1-55, and the stopping portion 1-93 may be adjusted according to the actual requirements. In some embodiments, only one of the holder 1-50 or the bottom 1-90 includes stopping portion.

The lower connection portion 1-56 is disposed close to the through hole 1-51. The lower connection portion 1-56 may be a protrusion. Part of the second elastic element 1-70 is immovably disposed on the bottom surface of the holder 1-50, and the lower connection portion 1-56 may strengthen the connection between the second elastic element 1-70 and the bottom surface of the holder 1-50. The receiving portion 1-57 is formed on the bottom surface of the holder 1-50. The reference element 1-60 is disposed on the receiving portion 1-57.

The holder 1-50 is movably connected to the bottom 1-90 by the first elastic element 1-20 and the second elastic element 1-70. The first elastic element 1-20 and the second elastic element 1-70 are made of elastic material or ductile material such as metal. In this technical field, the first elastic element 1-20 and the second elastic element 1-70 may be known as "spring", "leaf spring", "plate spring", etc.

As shown in FIG. 9, each second elastic element 1-70 includes two immovable part connection portions 1-71, two movable part connection portions 1-72, and two deformation portions 1-73. The immovable part connection portion 1-71 is immovably disposed on the immovable part 1-I. For example, the immovable part connection portion 1-71 is disposed on the first stage 1-94 of the bottom 1-90. The movable part connection portion 1-72 is immovably disposed on the movable part 1-M. For example, the movable part connection portion 1-72 is disposed on the bottom surface of the holder 1-50 of the movable part 1-M. The deformation portion 1-73 connects the immovable part connection portion 1-71 and the movable part connection portion 1-72.

When the immovable part connection portion 1-71 is connected to the immovable part 1-I and the movable part connection portion 1-72 is connected to the movable part 1-M, elongation or shrinkage of the second elastic elements 1-70 mainly depends on elongation or shrinkage of the deformation portion 1-73. Additionally, the holder 1-50 is held elastically by the first elastic element 1-20 and the second elastic element 1-70.

From Hooke's law, the magnitude of deformation is proportional to the applied force within particular range. The ratio of the applied force to the magnitude of deformation is defined as the elastic coefficient. That is, the elastic coefficient is the force needed for deformation per unit length. If the elastic coefficient is large, the object is less likely to deform. The deformation portion 1-73 has axial elastic coefficient and lateral elastic coefficient. The axial elastic coefficient is defined as the elastic coefficient along the optical axis 1-O while the lateral elastic coefficient is defined as the elastic coefficient in a direction that is perpendicular to the optical axis 1-O. In this embodiment, the lateral elastic coefficient is designed to be greater than the axial elastic coefficient, so that the second elastic elements 1-70 tend to deform in a direction that is parallel to the optical axis 1-O, rather than in a direction that is perpendicular to the optical axis 1-O. Using this design, the immovable part 1-I and the movable part 1-M may be stably connected to each other, and the second elastic elements 1-70 do not break easily.

Additionally, the second elastic element 1-70 includes at least one hole 1-74 and at least one electrical connection portion 1-75. The shape of the hole 1-74 and the electrical connection portion 1-75 are not limited thereto. The hole 1-74 is formed on the immovable part connection portion 1-71 and the immovable part connection portion 1-72. The connection portion 1-95 of the bottom 1-90 may pass through the hole 1-74 on the immovable part connection portion 1-71 to strengthen the connection between the immovable part connection portion 1-71 of the second elastic element 1-70 and the bottom 1-90. Similarly, the lower connection portion 1-56 of the holder 1-50 may pass through the hole 1-74 on the movable part connection portion 1-72 to strengthen the connection between the movable part connection portion 1-72 of the second elastic element 1-70 and the holder 1-50.

The electrical connection element 1-110 is disposed on the electrical connection portion 1-75, so that the second elastic element 1-70 is electrically connected to the circuit assembly 1-80 in the bottom 1-90. It should be noted that in this embodiment, the sensing element 1-100 and the electrical connection element 1-110 are disposed on different corners of the bottom 1-90 to simplify the process of electrical connection.

The first elastic element 1-20 also includes the part that is immovably disposed on the immovable part 1-I, the part that is immovably disposed on the movable part 1-M, and the part that is deformable. Specifically, part of the first elastic element 1-20 is immovably connected to the top surface of the pillar 1-92 of the bottom 1-90 and the top surface of the holder 1-50.

Held between the first elastic element 1-20 and the second elastic elements 1-70, the range of movement of the holder 1-50 is restricted when the movable part 1-M moves relative to the immovable part 1-I. Additionally, the holder 1-50 and the optical element 1-2 therein do not get damaged because of collision with the case 1-10 or the bottom 1-90 when the optical element driving mechanism 1-1 moves or is impacted.

Figure 10:
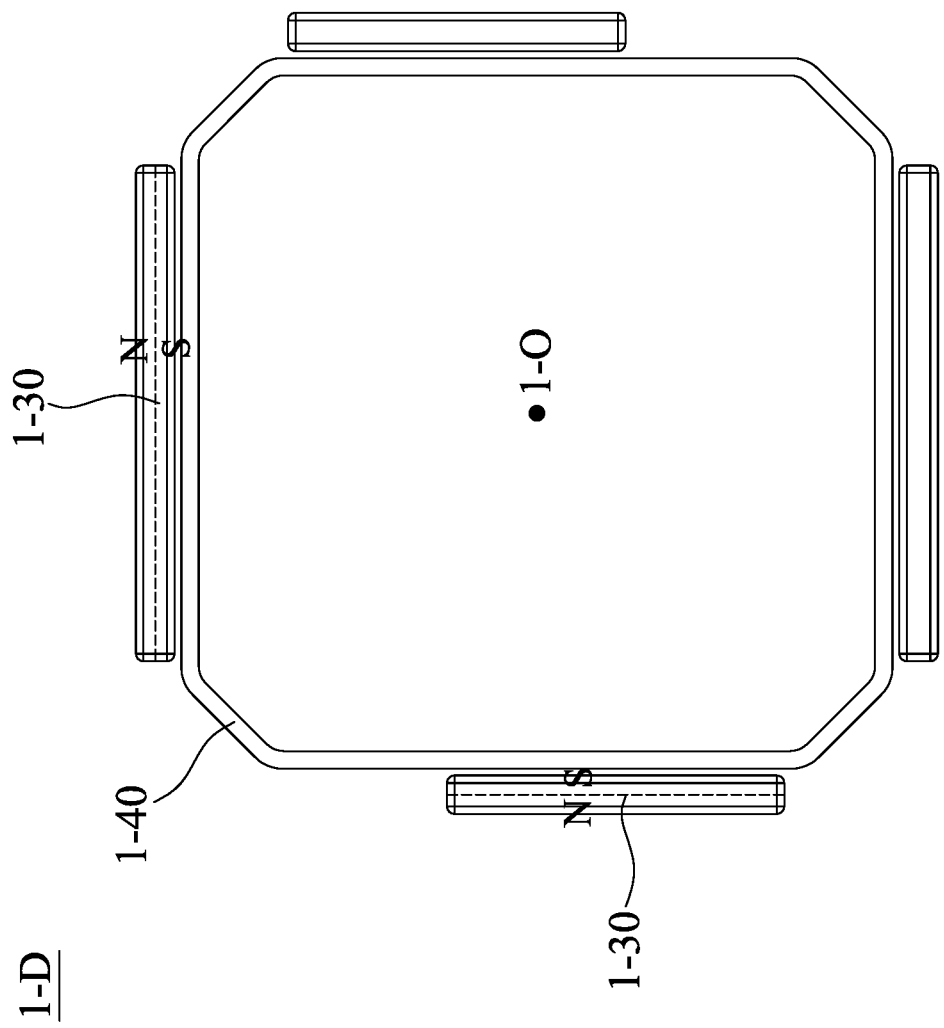
FIG. 10 is a schematic view of a driving assembly.

Next, please refer to FIG. 10 to understand the driving assembly 1-D. FIG. 10 is a schematic view of the driving assembly 1-D. The position of each of the magnetic elements 1-30 of the driving assembly 1-D corresponds to the position of each of the coil 1-40 of the driving assembly 1-D. Specifically, each magnetic element 1-30 surrounds the coil 1-40, and the coil 1-40 surrounds the holder 1-50. The magnetic element 1-30, the coil 1-40, and the holder 1-50 are at least partially overlapped to one another when viewed in a direction that is perpendicular to the central axis 1-C to reduce the size of the optical element driving mechanism 1-1 in the central axis 1-C to achieve miniaturization.

Furthermore, to prevent the magnetic element 1-30 from contacting with the winding portion 1-52 of the holder 1-50, the magnetic element 1-30 may be placed away from the winding portion 1-52. Therefore, as shown in FIG. 9, two of the magnet elements 1-30 that are opposite to each other are asymmetric. The winding portion 1-52 may be disposed on the side of the holder 1-50 rather than the top surface or the bottom surface because of the aforementioned placement, so that the size of the optical element driving mechanism 1-1 in the central axis 1-C is reduced and miniaturization is achieved.

Each magnetic element 1-30 is rectangular, and the coil 1-40 is polygonal. The magnetic element 1-30 may be a magnet such as a permanent magnet. The arrangement direction of the pair of magnetic poles (N-pole and S-pole) of the magnetic element 1-30 is perpendicular to the optical axis 1-O. The magnetic poles shown in FIG. 10 are for illustration and are not limited thereto. As a result, for the coil 1-40, the magnetic field generated by the magnetic element 1-30 is substantially perpendicular to the optical axis 1-O. When the current is supplied to the coil 1-40, magnetic force that is parallel with the optical axis 1-O may be generated between the magnetic elements 1-30 and the coil 1-40 for driving the holder 1-50 and the optical element 1-2 therein to move along the optical axis 1-O.

Figure 11:
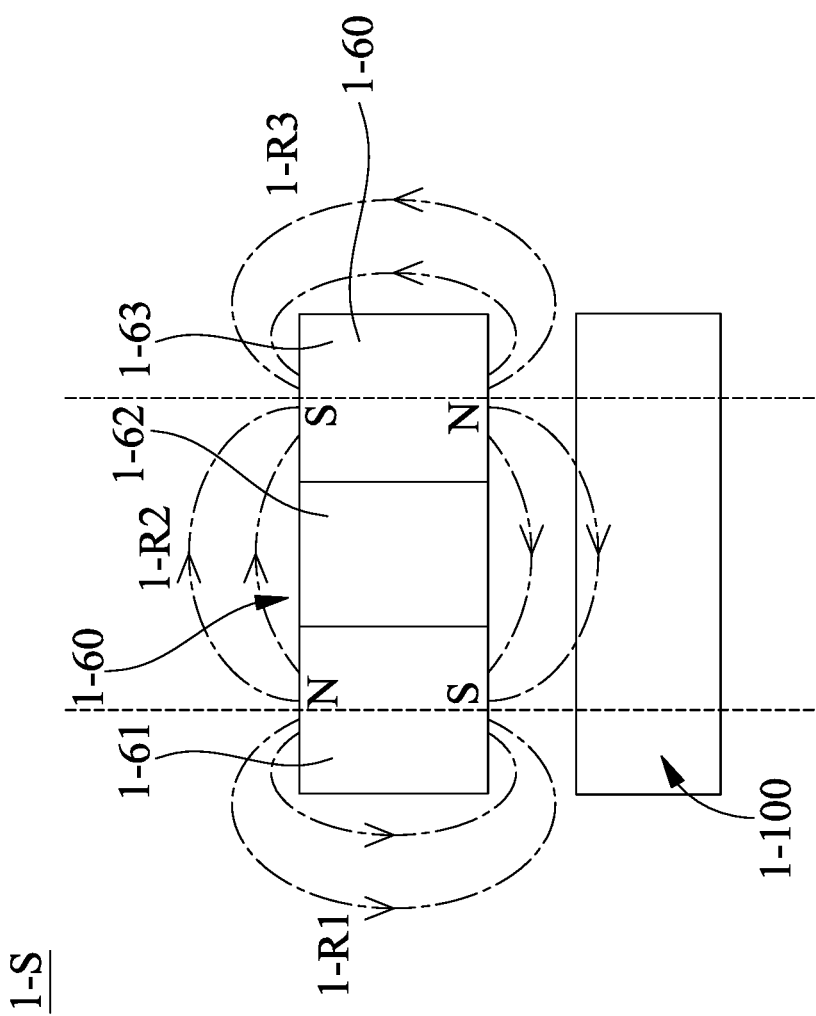
FIG. 11 is a schematic view of the sensing assembly.

Next, please refer to FIG. 11 to understand the sensing assembly 1-S. FIG. 11 is a schematic view of the sensing assembly 1-S, and the magnetic lines of force is schematically shown in dotted lines. The position of the reference element 1-60 of the sensing assembly 1-S corresponds to the position of the sensing element 1-100 of the sensing assembly 1-S. As described above, the reference element 1-60 is disposed on the receiving portion 1-57 on the bottom surface of the holder 1-50 and the sensing element 1-100 is disposed on the recess 1-97 of the bottom 1-90.

The reference element 1-60 may be a magnetic element such as a permanent magnet. In this embodiment, the reference element 1-60 includes multiple pairs of magnetic poles. The sensing element 1-100 may be a Hall sensor, a giant magneto resistance (GMR) sensor, a tunneling magneto resistance (TMR) sensor, and the like. Compared to Hall sensors, magneto resistance sensors have better accuracy and lower power consumption.

As shown in FIG. 11, the reference element 1-60 at least partially overlaps the sensing element 1-100 when viewed along the central axis 1-C. The reference element 1-60 includes at least two magnetic domains 1-61, 1-63 and a depletion region 1-62 located between the magnetic domain 1-61 and the magnetic domain 1-63. When a multi-pole magnet is manufactured, only the magnetic domain 1-61 and the magnetic domain 1-63 are magnetized, so a depletion region 1-62 is formed. The magnetic domain 1-61 and the magnetic domain 1-63 have a pair of N-pole and S-pole, respectively.

By designing the reference element 1-60 as a multi-pole magnet with multiple magnetic domains, the magnetic lines of force of the reference element 1-60 are closer. Additionally, the sensing accuracy may be further improved without increasing the volume of the reference element 1-60. As a result, the size of the reference element 1-60 may also be reduced, thereby the power consumption of the optical element driving mechanism 1-1 may be reduced and miniaturization may be achieved.

The S-pole of the magnetic domain 1-61 faces the sensing element 1-100, and the N-pole of the magnetic domain 1-63 faces the sensing element 1-100. It should be noted that in some other embodiments, the N-pole of the magnetic domain 1-61 faces the sensing element 1-100, and the S-pole of the magnetic domain 1-63 faces the sensing element 1-100.

Since the magnetic lines of force points to the S-pole from the N-pole, the side that the reference element 1-60 faces the sensing element 1-100 is divided into a first region 1-R1, a second region 1-R2, and a third region 1-R3 by the different directions of the magnetic lines of force. In the first region 1-R1, the magnetic lines of force of the reference element 1-60 point to the S-pole of the magnetic domain 1-61 from the N-pole of the magnetic domain 1-61. In the second region 1-R2, the magnetic lines of force of the reference element 1-60 point to the S-pole of the magnetic domain 1-61 from the N-pole of the magnetic domain 1-63. In the third region 1-R3, the magnetic lines of force of the reference element 1-60 point to the S-pole of the magnetic domain 1-63 from the N-pole of the magnetic domain 1-63. Moreover, the density of magnetic lines of force may be different in the first region 1-R1, the second region 1-R2, and the third region 1-R3.

When the holder 1-50 moves along the optical axis 1-O within a range of movement, the reference element 1-60 disposed on the holder 1-50 also moves along the optical axis 1-O relative to the sensing element 1-100, so that the sensing element 1-100 may sense the change of the magnetic field, including the density change of the magnetic lines of force and/or the direction change of the magnetic lines of force. When the holder 1-50 is within the range of movement, the reference element 1-60 does not overlap the sensing element 1-100 within the range of movement of the holder 1-50 when viewed in a direction that is perpendicular to the optical axis 1-O.

It should be noted that the magnetic element 1-30 close to the reference element 1-60 also provides a fixed amount of magnetic field. Therefore, the magnetic field sensed by the sensing element 1-100 is the summation of the fixed amount of magnetic field provided by the magnetic element 1-30 close to the reference element 1-60 and the variable magnetic field provided by the reference element 1-60. The exact position of the holder 1-50 may be known by the sensing element 1-100, which sense the density change of the magnetic lines of force and/or the direction change of the magnetic lines of force.

In some conventional optical element driving mechanisms, a circuit board is needed for placing the sensing element. Relatively, in the present disclosure, the sensing element 1-100 is disposed on the bottom 1-90 and thus the circuit board is omitted. Therefore, there is no need to configure space for the sensing element 1-100, so that noise generated by the circuit board is reduced, the weight of the optical element driving mechanism 1-1 is lightened, and miniaturization of the optical element driving mechanism 1-1 is achieved.

In some embodiments, the optical element driving mechanism 1-1 includes two sensing assemblies S disposed on the opposite corners (the diagonal line) of the optical element driving mechanism 1-1 to further enhance the sensing accuracy. Additionally, the number of the sensing assembly 1-S may be adjusted according to the actual requirements. Furthermore, in addition to being disposed on the corner of optical element driving mechanism 1-1, the sensing assembly 1-S may also be disposed on the side of the optical element driving mechanism 1-1.

In this embodiment, the optical element driving mechanism 1-1 further includes a counterweight object 1-65 and a counterweight piece 1-105. The counterweight object 1-65 may be made of material that has similar density to the reference element 1-60. For example, the counterweight object 1-65 may be a magnet or a metal. The counterweight object 1-65 is disposed on the holder 1-50, opposite to the reference element 1-60, to achieve weight balance. In some embodiments, the reference element 1-60 and the counterweight object 1-65 are disposed on different receiving portions 1-57 located on the opposite corners (the diagonal line) of the bottom surface of the holder 1-50. The counterweight piece 1-105 may be made of material that has similar density to the sensing element 1-100. The counterweight piece 1-105 is disposed on the bottom 1-90, opposite to the sensing element 1-100, to achieve weight balance. In some embodiments, the sensing element 1-100 and the counterweight piece 1-105 are disposed on different recesses 1-97 located on the opposite corners (the diagonal line) of the top surface of the bottom 1-90.

Figure 12:
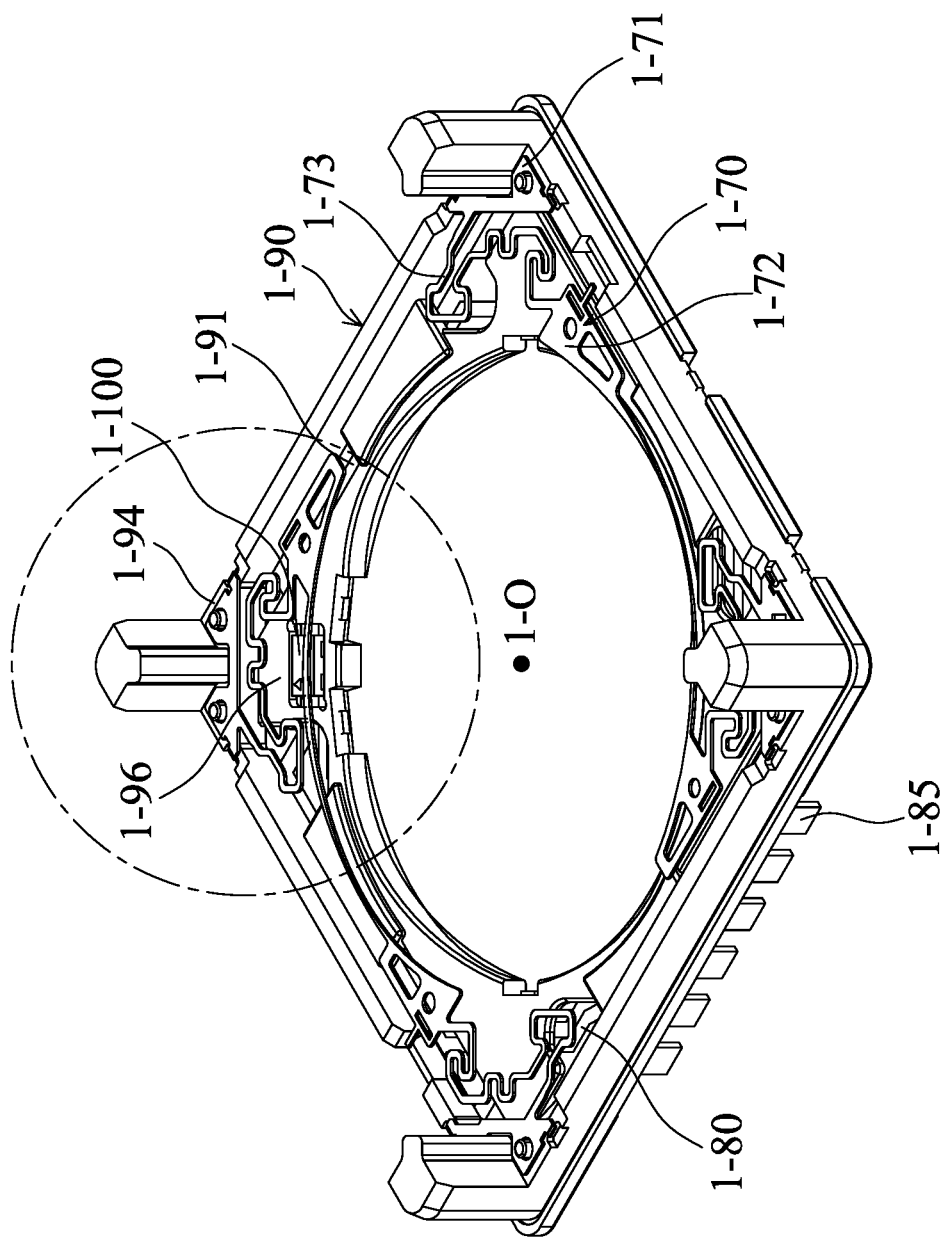
FIG. 12 is a perspective view of the second elastic element, the bottom, and a sensing element.
Figure 13:
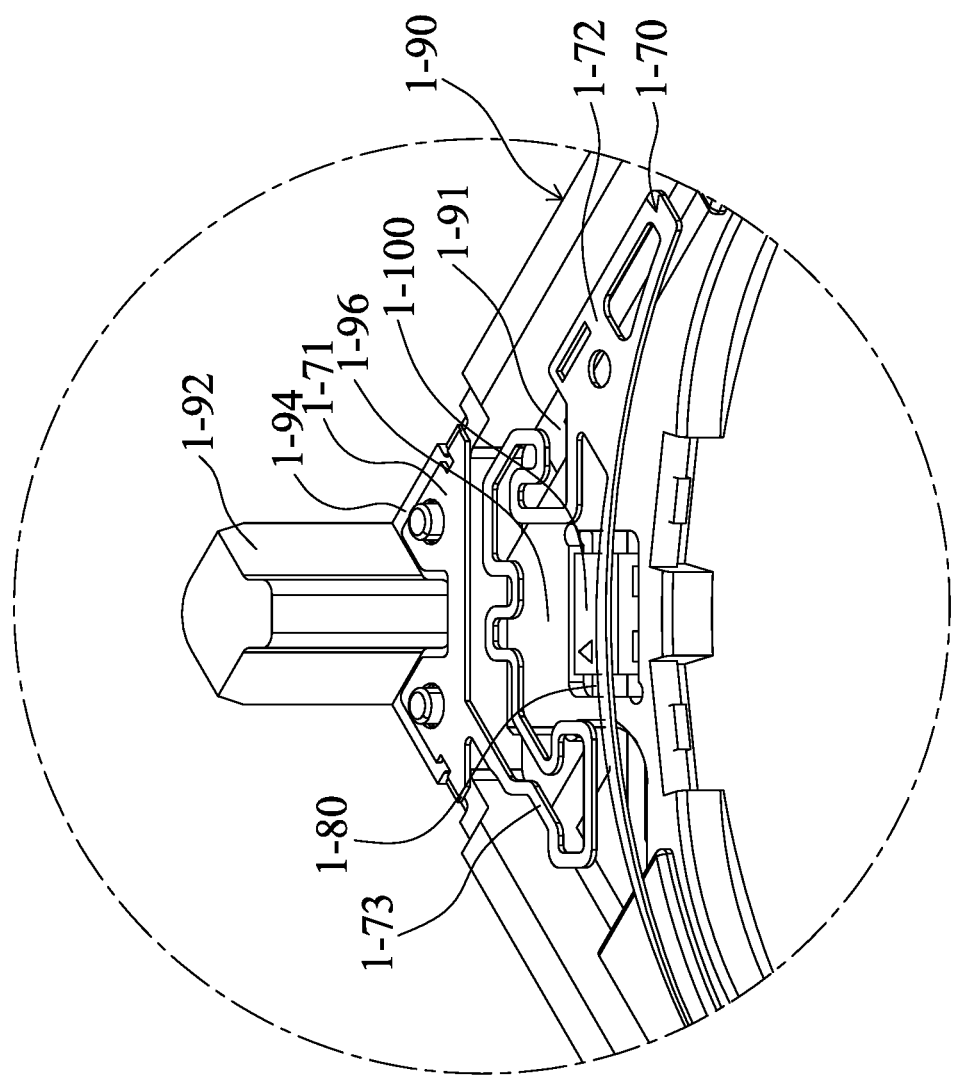
FIG. 13 and FIG. 14 are schematic views of the second elastic element, the bottom, and the sensing element.
Figure 14:
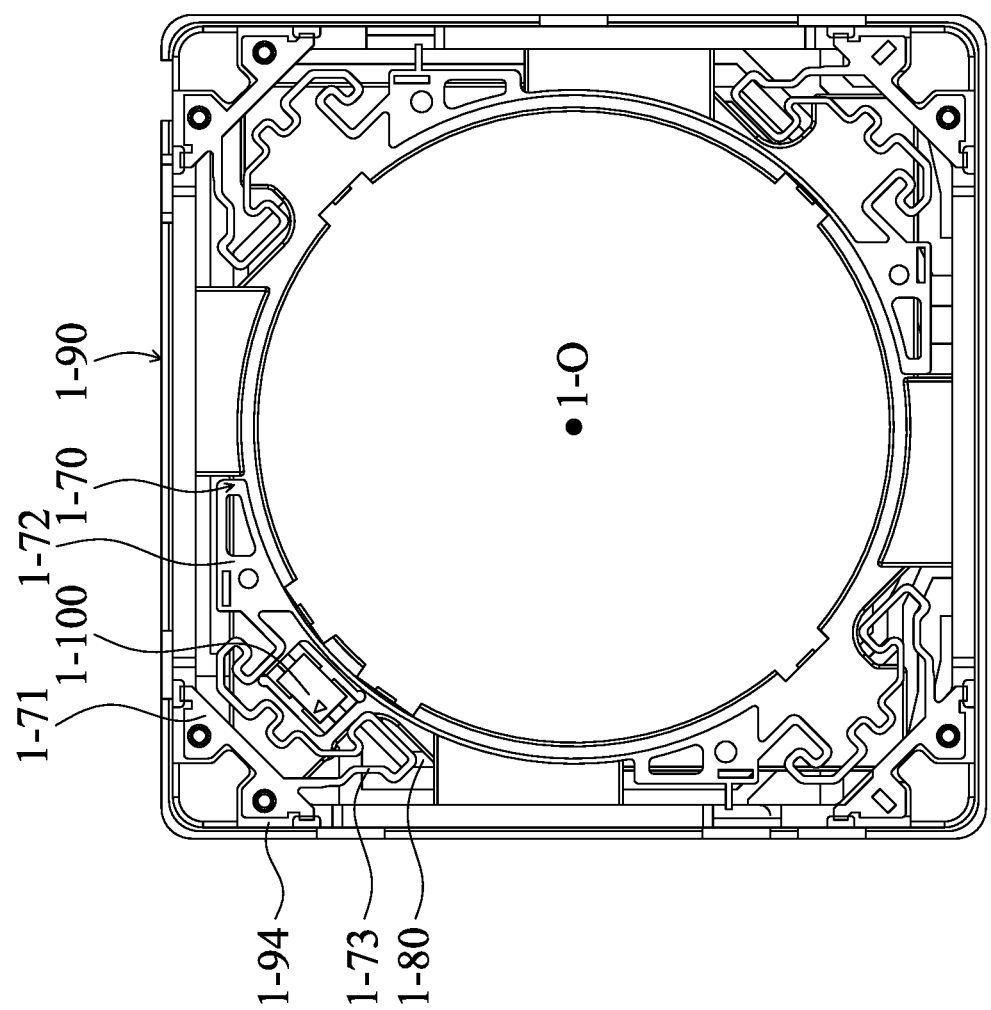

Next, please refer to FIG. 12 to FIG. 14 to understand the position relationship between the second elastic element 1-70, the bottom 1-90, and the sensing element 1-100. FIG. 12 is a perspective view of the second elastic element 1-70, the bottom 1-90, and the sensing element 1-100. FIG. 13 and FIG. 14 are schematic views of the second elastic element 1-70, the bottom 1-90, and the sensing element 1-100. As shown in FIG. 12 to FIG. 14, the second stage 1-96 is closer to the sensing element 1-100 than the first stage 1-94. The first stage 1-94 and the second stage 1-96 may protect the sensing element 1-100.

The maximum size of the first stage 1-94 in the optical axis 1-O is larger than the maximum size of the sensing element 1-100 in the optical axis 1-O. In this embodiment, the sensing element 1-100 does not protrude from the second stage 1-96 when viewed in a direction that is perpendicular to the optical axis 1-O. Yet, in other embodiments, the maximum size of the sensing element 1-100 in the optical axis 1-O is larger than the maximum size of the second stage 1-96 in the optical axis 1-O, so that the sensing element 1-100 protrudes from the second stage 1-96.

The space for the deformation portion 1-73 of the second elastic element 1-70 to deform is sufficient because the immovable part connection portion 1-71 is disposed on the first stage 1-94 and the first stage 1-94 is higher than the base plate 1-91. Additionally, as shown in FIG. 14, the second elastic element 1-70 does not overlap the sensing element 1-100 when viewed along the optical axis 1-O. In other words, the deformation portion 1-73 of the second elastic element 1-70 stays away from the sensing element 1-100. Also, the second elastic element 1-70 and the bottom 1-90 are spaced apart a distance.

It should be noted that after assembling the optical element driving mechanism 1-1, tests such as a dependability test or a reliability test is conducted to ensure the stability of every elements of the optical element driving mechanism 1-1. For example, the optical element driving mechanism 1-1 is flipped upside down. These tests may make the movable part 1-M move or rotate relative to the immovable part 1-I. Also, the first elastic element 1-20 and the second elastic element 1-70 deform as well. When the second elastic element 1-70 deforms, the second elastic element 1-70 is not in contact with the bottom 1-90 because of the first stage 1-94. Therefore, the damage caused by the collision between the elements is prevented. Additionally, black spots on the images or video caused by particles or debris caused by the collision between the elements are prevented as well.

How the current passes through the optical element driving mechanism 1-1 is described in detail herein. The pins 1-85 are used for the current to flow in or flow out. The direction of the current is controlled according to the desired movement direction for correction, for example, whether the holder 1-50 moves toward or away from the bottom 1-90. In this embodiment, four pins 1-85 are electrically connected to the sensing element 1-100. Among the four pins 1-85, two pins 1-85 are used for inputting the power supply to provide the current for the sensing element 1-100, and the other two pins may output the sensed signal.

First, the current provided a power supply (not shown) outside the optical element driving mechanism 1-1 flows into the optical element driving mechanism 1-1 via the pins 1-85, then flows to the circuit assembly 1-80 connected to the pins 1-85, and then flows to the sensing element 1-100 electrically connected to the circuit assembly 1-80. Next, the result sensed by the sensing element 1-100 is output to the pins 1-85 in the form of current and then output to a driver integrated circuit (driver IC) (not shown). The power supply and the driver IC may be integrated into a central process unit (CPU).

There are two pins 1-85 that are not electrically connected to the sensing element 1-100. The current signal corrected by the driver IC is input to the optical element driving mechanism 1-1 via one of the two pins 1-85, then the current flows to the circuit assembly 1-80 connected to the pin 1-85, and then the current flows to the second elastic element 1-70 at the electrical connection portion 1-75 of the second elastic element 1-70 via the electrical connection element 1-110. As described above, the second elastic element 1-70 is electrically connected to the coil 1-40 at the winding portion 1-52 of the holder 1-50. Therefore, the current subsequently flows to the coil 1-40, and the magnetic driving force is generated between the coil 1-40 and the magnetic element 1-30 according to the corrected current signal, so that closed-loop feedback is achieved. Next, the current flows to the winding portion 1-52 on the opposite side, sequentially flows to the second elastic element 1-70, the circuit assembly 1-80, and the other one of the two pins 1-85, and eventually flows out of the optical element driving mechanism 1-1.

Therefore, the driving signal of the driving assembly 1-D is corrected by the detection of the sensing assembly 1-S, and closed-loop feedback is achieved, thereby suitable displacement correction, displacement compensation, and the like are accomplished.

Next, another optical element driving mechanism 1-1' is described. Additionally, the same or similar elements are denoted by similar symbols, the same or similar elements are able to perform the same or similar functions, and related contents are not repeated.

Figure 15:
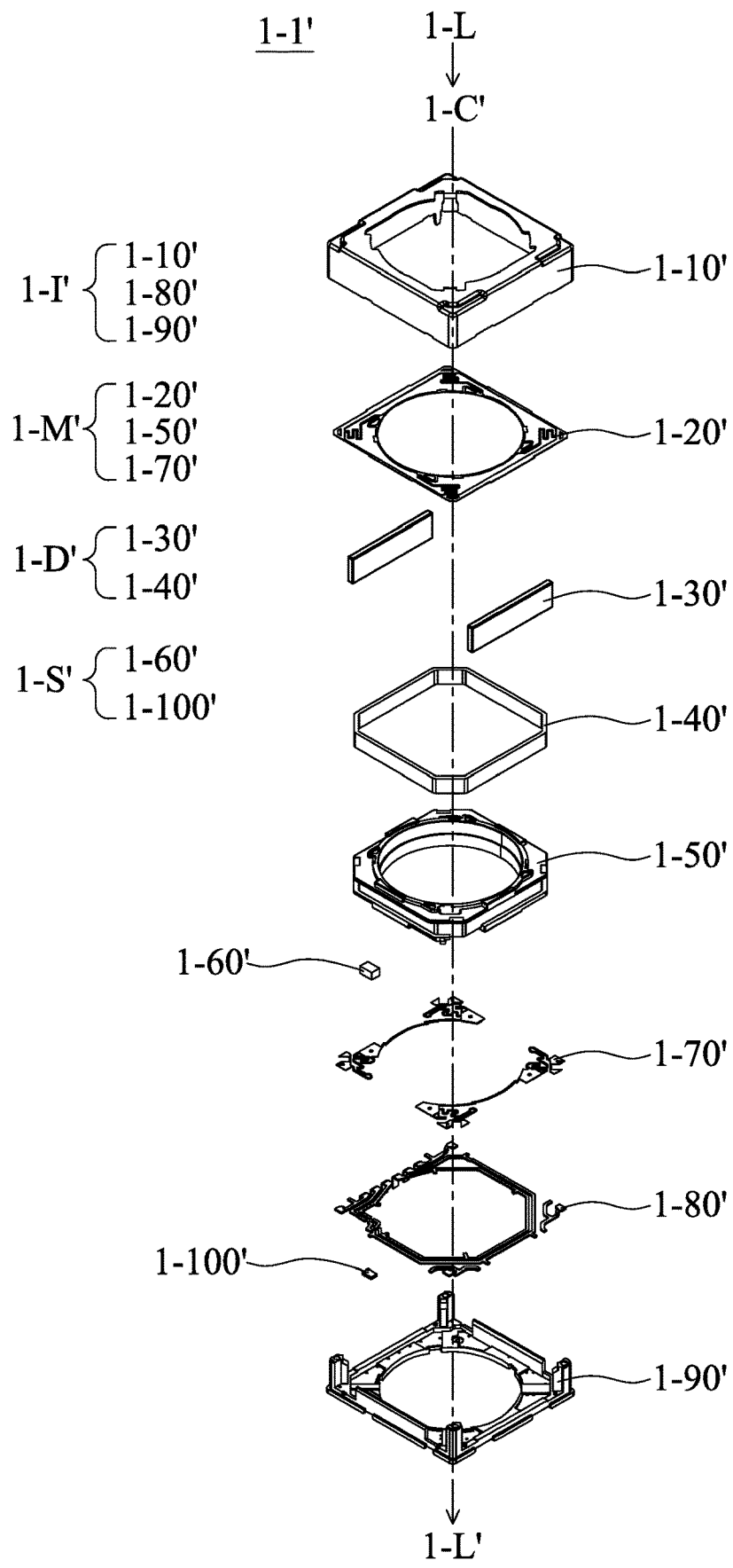
FIG. 15 is an exploded view of another optical element driving mechanism.

FIG. 15 is an exploded view of the optical element driving mechanism 1-1'. Similar to optical element driving mechanism 1-1, the optical element driving mechanism 1-1' includes an immovable part 1-I', a movable part 1-M', a driving assembly 1-D', and a sensing assembly 1-S'. The immovable part 1-I', the movable part 1-M', the driving assembly 1-D', and the sensing assembly 1-S' are arranged along a central axis 1-C' passing through the center of the optical element driving mechanism 1-1'. The movable part 1-M' connects to the optical element 1-2. The movable part 1-M' is movable relative to the immovable part 1-I'. The driving assembly 1-D' drives the movable part 1-M' to move relative to the immovable part 1-I'. The sensing assembly 1-S' senses the movement of the movable part 1-M' relative to the immovable part 1-I'.

Similar to optical element driving mechanism 1-1, the immovable part 1-I' includes a case 1-10', a circuit assembly 1-80', and a bottom 1-90'. The movable part 1-M' includes a first elastic element 1-20', a holder 1-50', and two second elastic elements 1-70'. The driving assembly 1-D' includes two magnetic elements 1-30' and coil 1-40'. The sensing assembly 1-S' includes a reference element 1-60' and a sensing element 1-100'.

The main difference between the optical element driving mechanism 1-1 and the optical element driving mechanism 1-1' is that the number of the magnetic elements 1-30' of the driving assembly 1-D', the position of the sensing assembly 1-S', and the configuration of the reference element 1-60'.

Figure 16:
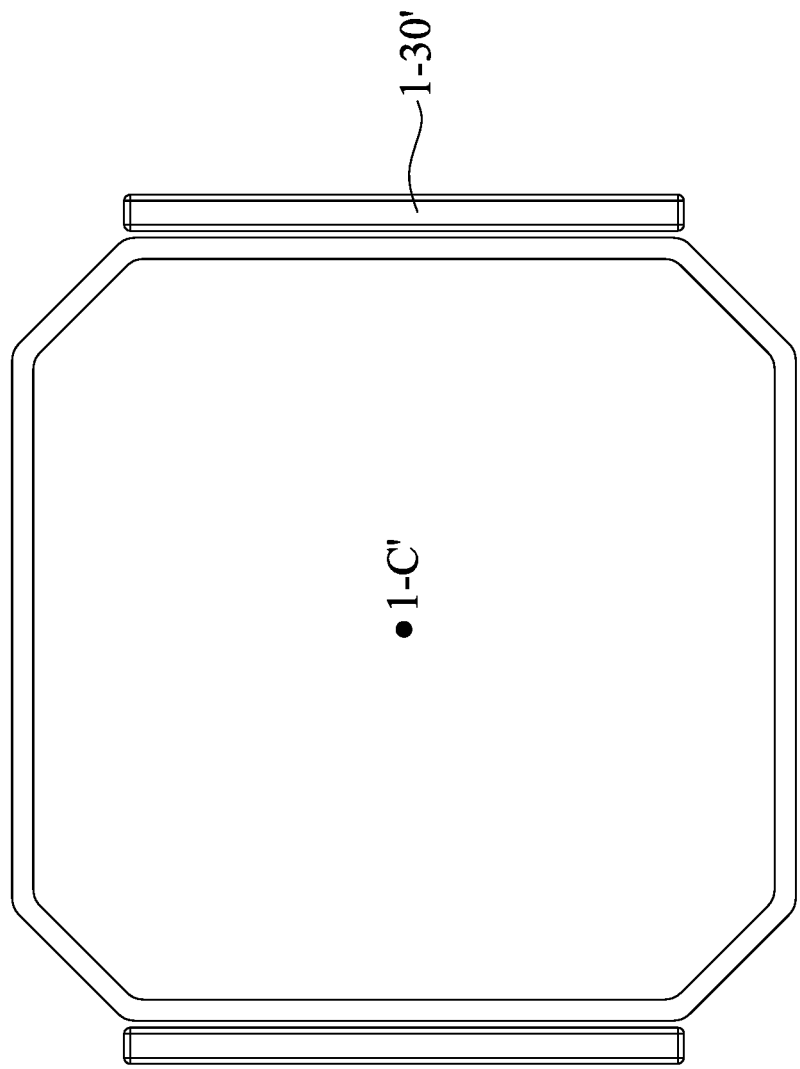
FIG. 16 is a schematic view of a driving assembly of the optical element driving mechanism.

FIG. 16 is a schematic view of the driving assembly 1-D' of the optical element driving mechanism 1-1'. As shown in FIG. 16, the driving assembly 1-D' of the optical element driving mechanism 1-1' only has two magnetic elements 1-30' asymmetrically disposed on opposite sides. Therefore, the weight of the optical element driving mechanism 1-1' may be reduced, the cost may be reduced, and the like.

Figure 17:
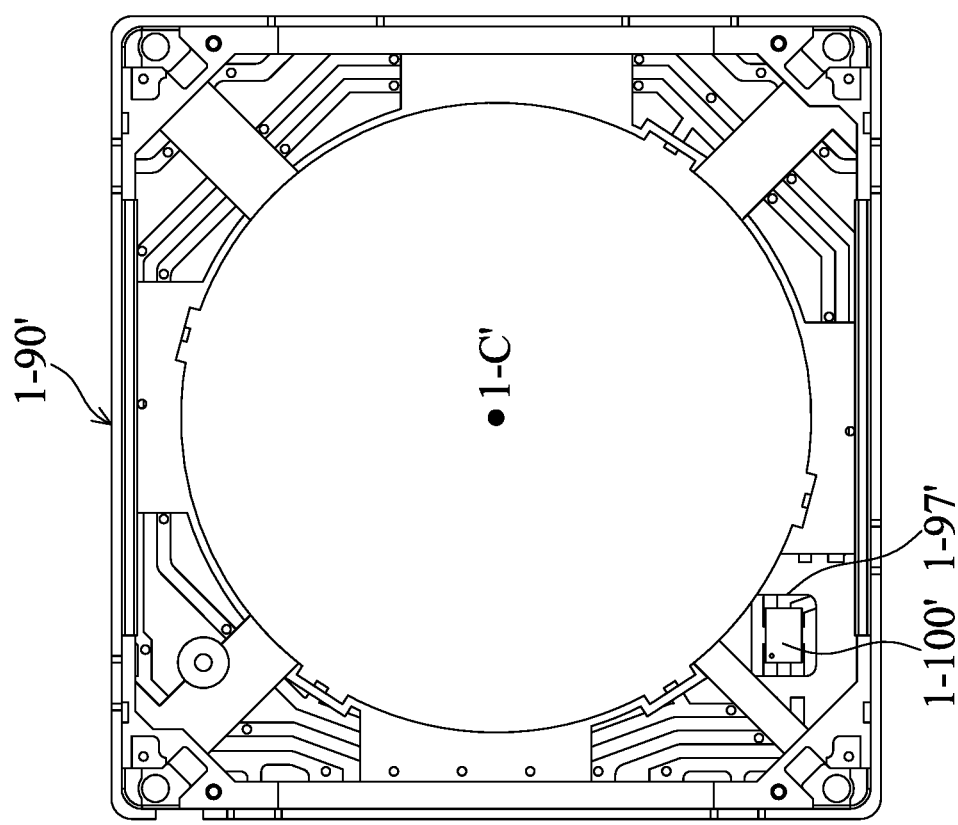
FIG. 17 is top view of a bottom and a sensing element of the optical element driving mechanism.

FIG. 17 is top view of the bottom 1-90' and the sensing element 1-100' of the optical element driving mechanism 1-1'. As shown in FIG. 17, the position of a recess 1-97' for placing the sensing element 1-100' is different from the position of the recess 1-97. The edge of the recess 1-97' is substantially parallel with the edge of the bottom 1-90', and the edge of the sensing element 1-100' is substantially parallel with the edge of the recess 1-97'. It should be noted that the position of the reference element 1-60' corresponds to the position of the sensing element 1-100', so that the position of a receiving portion (not shown) for placing the reference element 1-60' is different from the position of the receiving portion 1-57.

Figure 18:
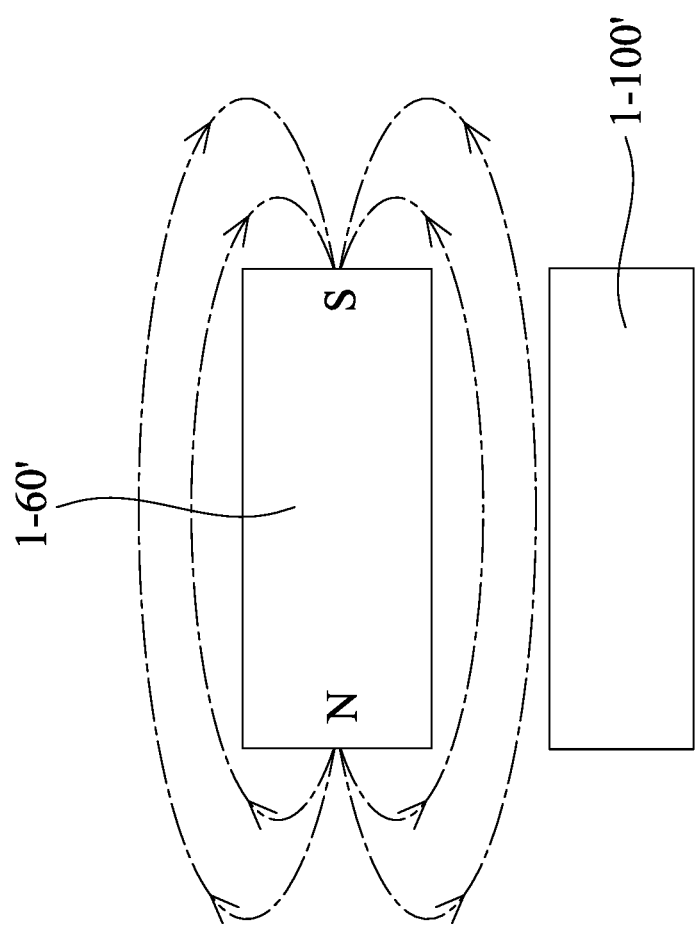
FIG. 18 is a schematic view of a sensing assembly of the optical element driving mechanism.

FIG. 18 is a schematic view of the sensing assembly 1-S' of the optical element driving mechanism 1-1'. The reference element 1-60' may be a permanent magnet. Different from the reference element 1-60, the reference element 1-60' only includes one pair of N-pole and S-pole. Similarly, the magnetic field sensed by the sensing element 1-100' of the optical element driving mechanism 1-1' is the summation of the fixed amount of magnetic field provided by the magnetic element 1-30' close to the reference element 1-60' and the variable magnetic field provided by the reference element 1-60'.

As described above, an optical element driving mechanism is provided. The sensing assembly may sense the movement of the movable part relative to the immovable part to achieve closed-loop feedback. The sensing element is disposed on the bottom and thus the circuit board may be omitted to reduce noise and achieve miniaturization. The bottom has special structures, including the base plate, the first stage, the second stage, etc. The structural strength is enhanced, the sensing element is protected, sufficient space for the second elastic element to deform is provided, and the like.

The Second Embodiment Group

Figure 19:
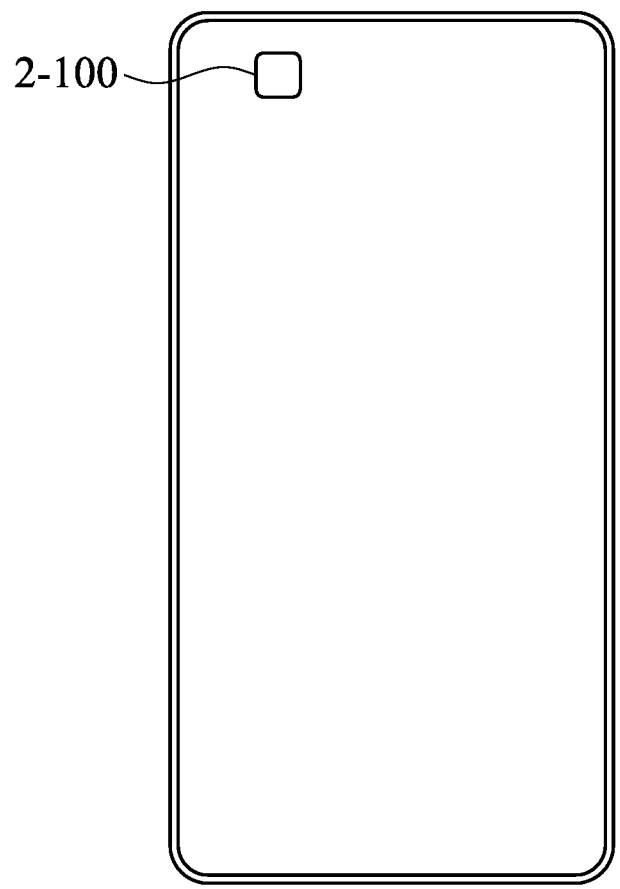
FIG. 19 shows a schematic view of an electrical device with an optical element driving mechanism according to an embodiment of the present disclosure.

Firstly, please refer to FIG. 19, an optical element driving mechanism 2-100 of an embodiment of the present disclosure may be mounted in an electrical device 2-1 for taking photos or videos, wherein the aforementioned electrical device 2-1 may, for example, be a smartphone or a digital camera, but the present disclosure is not limited to these. It should be noted that the position and the size between the optical element driving mechanism 2-100 and the electrical device 2-1 shown in FIG. 19 are only an example, which is not for limiting the position and the size between the optical element driving mechanism 2-100 and the electrical device 2-1. In fact, according to different needs, the optical element driving mechanism 2-100 may be mounted at different positions in the electrical device 2-1.

Figure 20:
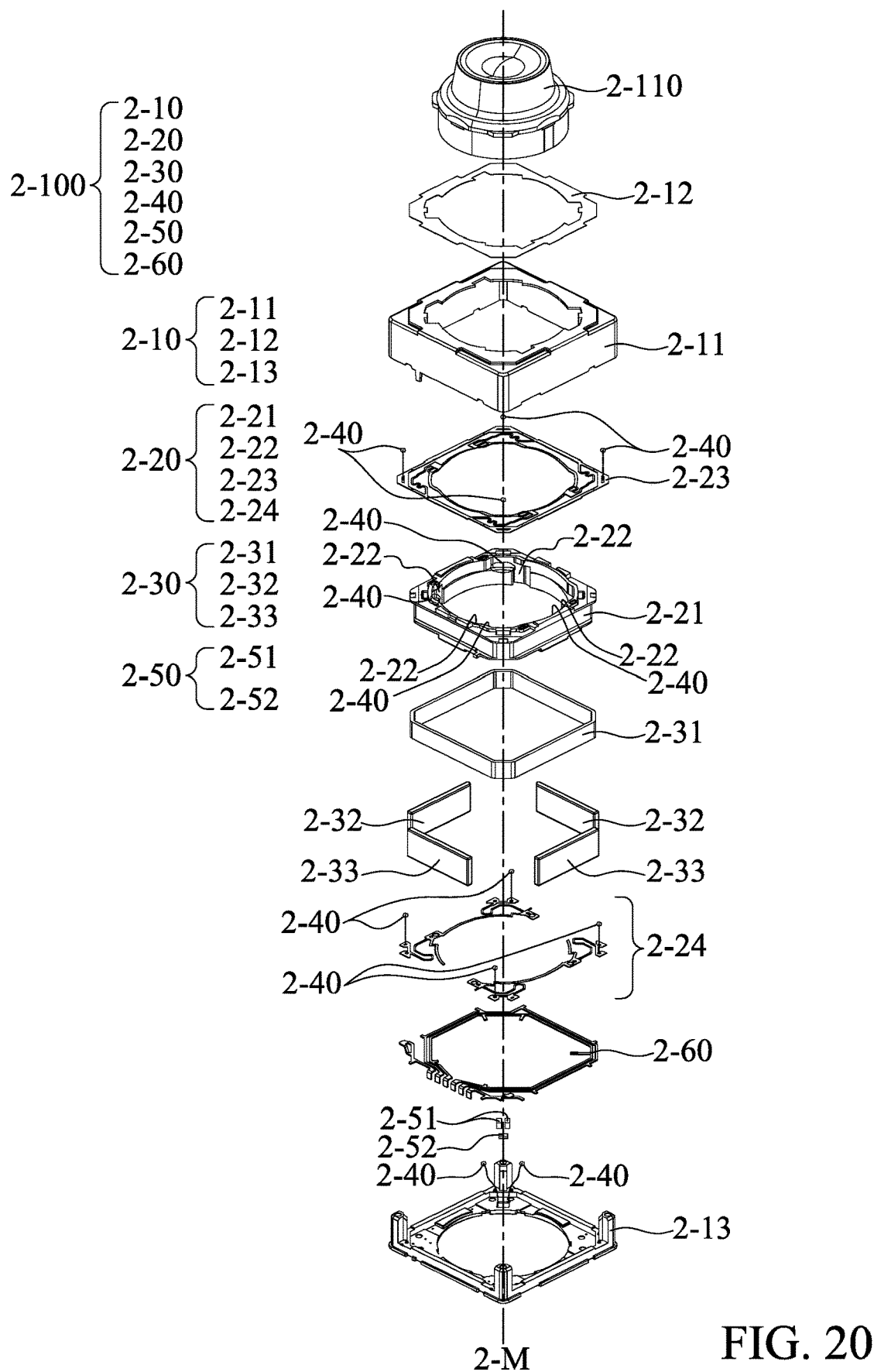
FIG. 20 shows an exploded view of the optical element driving mechanism and an optical element according to an embodiment of the present disclosure.
Figure 21:
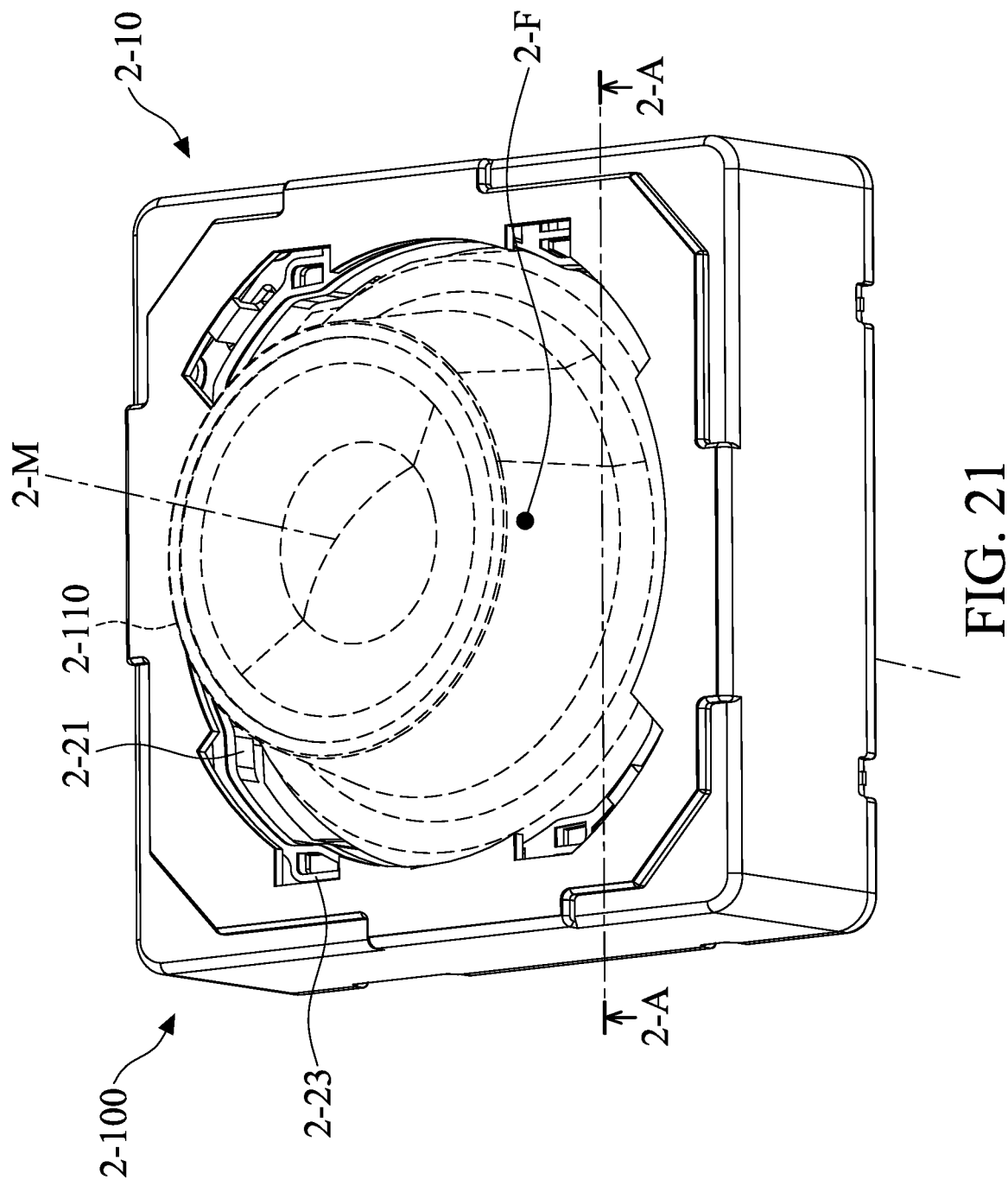
FIG. 21 shows a perspective view of the optical element driving mechanism and the optical element according to an embodiment of the present disclosure, wherein the optical element is shown as a dashed line.

Please refer to FIGS. 20 and 21. FIG. 20 is an exploded view of the optical element driving mechanism 2-100 and an optical element 2-110 according to an embodiment of the present disclosure. FIG. 21 is a perspective view of the optical element driving mechanism 2-100 and the optical element 2-110 according to an embodiment of the present disclosure, wherein the optical element 2-110 is shown as a dashed line. As shown in FIGS. 20 and 21, the optical element driving mechanism 2-100 includes a fixed part 2-10, a movable part 2-20, a driving assembly 2-30, a plurality of adhering elements 2-40, a sensing assembly 2-50, and a circuit assembly 2-60. The fixed part 2-10 includes an outer frame 2-11, a protective structure 2-12 and a bottom plate 2-13. The movable part 2-20 includes a holder 2-21, four positioning structures 2-22, an upper spring 2-23 and a lower spring 2-24. The driving assembly 2-30 includes a driving coil 2-31, two first driving magnets 2-32 and two second driving magnets 2-33. The sensing assembly 2-50 includes two sensing magnets 2-51 and a sensing element 2-52. The optical element driving mechanism 2-100 also has a main axis 2-M. The main axis 2-M passes through a center point 2-F of the optical element driving mechanism 2-100, and the main axis 2-M penetrates the fixed part 2-10. As shown in FIG. 21, the holder 2-21 is movably disposed on the fixed part 2-10 and is connected to the optical element 2-110. Specifically, the optical element 2-110 is connected to the holder 2-21, and the optical element 2-110 may move as the holder 2-21 moves relative to the fixed part 2-10.

Figure 22:
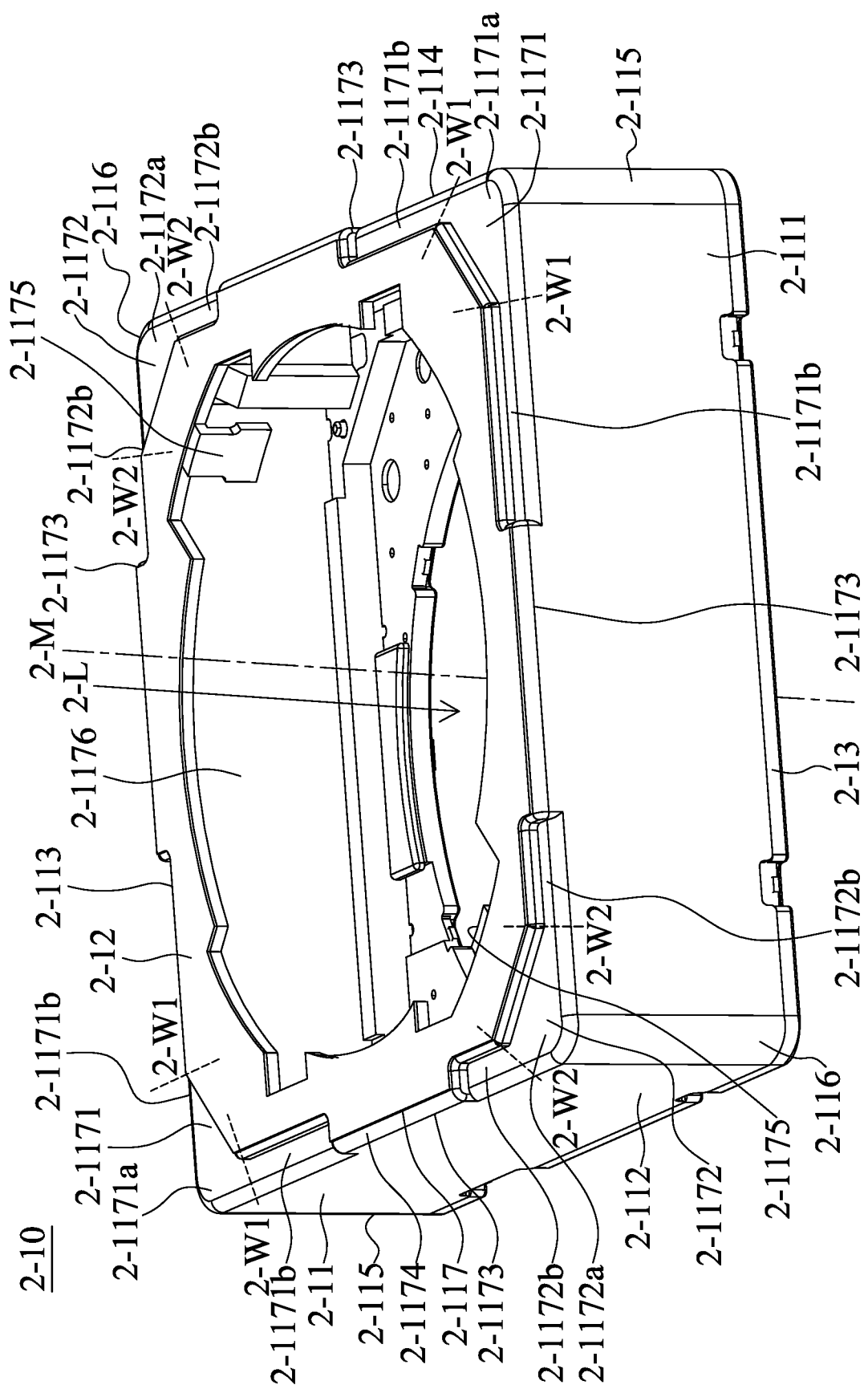
FIG. 22 shows a perspective view of a fixed part according to an embodiment of the present disclosure.

Please refer to FIG. 22. FIG. 22 is a perspective view of the fixed part 2-10 according to an embodiment of the present disclosure. As shown in FIG. 22, the outer frame 2-11 of the fixed part 2-10 may have a polygonal structure, and the outer frame 2-11 may be made of a metal with magnetic conductivity. The outer frame 2-11 includes a first wall 2-111, a second wall 2-112, a third wall 2-113, a fourth wall 2-114, two first corners 2-115, two second corners 2-116 and an outer frame top 2-117. Moreover, the main axis 2-M is parallel to a direction from the outer frame top 2-117 to the bottom plate 2-13.

As shown in FIG. 22, the first wall 2-111 is connected to the second wall 2-112 and the fourth wall 2-114, and the first wall 2-111 is opposite the third wall 2-113. The second wall 2-112 is further connected to the third wall 2-113, and the second wall 2-112 is opposite the fourth wall 2-114. The third wall 2-113 is further connected to the fourth wall 2-114. The two first corners 2-115 are respectively located at the junction of the first wall 2-111 and the fourth wall 2-114 and the junction of the second wall 2-112 and the third wall 2-113. The two second corners 2-116 are respectively located at the junction of the first wall 2-111 and the second wall 2-112 and the junction of the third wall 2-113 and the fourth wall 2-114. The outer frame top 2-117 is connected to the first wall 2-111, the second wall 2-112, the third wall 2-113 and the fourth wall 2-114. The outer frame top 2-117 includes two first recessed portions 2-1171, two second recessed portions 2-1172, four outer frame top side edges 2-1173, an outer frame top surface 2-1174, two extension portions 2-1175 and an opening 2-1176.

Please continue referring to FIG. 22, the two first recessed portions 2-1171 are respectively located at the two first corners 2-115, the two second recessed portions 2-1172 are respectively located at the two second corners 2-116, and the two first recessed portions 2-1171 and the two second recessed portions 2-1172 are all located on the outer frame top side edges 2-1173. The first recessed portions 2-1171 and the second recessed portions 2-1172 is recessed downwardly along the main axis 2-M, that is, the outer frame top 2-117 is not a plane when viewed in a direction perpendicular to the main axis 2-M. The first recessed portion 2-1171 includes a first main recess 2-1171*a* and two first end recesses 2-1171*b*. As shown in FIG. 22, the first main recess 2-1171*a* and the first end recesses 2-1171*b* are bounded by dashed lines 2-W1. The first end recesses 2-1171*b* extend from the first main recess 2-1171*a* along the outer frame top side edge 2-1173, but the two first end recesses 2-1171*b* are not directly connected. More specifically, the first main recess 2-1171*a* is located at the first corner 2-115, and the first end recesses 2-1171*b* are located on the outer frame top side edge 2-1173. The second recessed portion 2-1172 includes a second main recess 2-1172*a* and two second end recesses 2-1172*b*. As shown in FIG. 22, the second main recess 2-1172*a* and the second end recesses 2-1172*b* are bounded by dashed lines 2-W2. The second end recesses 2-1172*b* extend from the second main recess 2-1172*a* along the outer frame top side edge 2-1173, but the two second end recesses 2-1172*b* are not directly connected. More specifically, the second main recess 2-1172*a* is located at the second corner 2-116, and the second main recesses 2-1172*b* are located on the outer frame top side edge 2-1173. It should be noted that the lengths of the first end recesses 2-1171*b* may not be the same as that of the second end recesses 2-1172*b*. That is, the shape of the first recessed portion 2-1171 may differ from the shape of the second recessed portion 2-1172 when viewed along the main axis 2-M. In this embodiment, the lengths of the first end recesses 2-1171*b* are longer than that of the second end recesses 2-1172*b*.

As shown in FIG. 22, the outer frame top surface 2-1174 is the top surface of the outer frame top 2-117. That is, same as the outer frame top 2-117, the outer frame top surface 2-1174 is not a plane when viewed in the direction perpendicular to the main axis 2-M. The protective structure 2-12 is disposed on the outer frame top surface 2-1174, so as to prevent external dust, liquids or the like from entering the optical element driving mechanism 2-100. The two extension portions 2-1175 are respectively located at the two second corners 2-116, but no extension portions 2-1175 are provided at the first corners 2-115. That is, the extension portions 2-1175 are respectively located at non-adjacent corners when viewed along the main axis 2-M. The extension portions 2-1175 pass through the opening 2-1176 downwardly from the outer frame top 2-117, and extend to the movable part 2-20 (may refer to FIG. 24). The opening 2-1176 may allow a light 2-L to pass through, so that the light 2-L is incident into the optical element 2-110 (not shown in FIG. 22).

Figure 23:
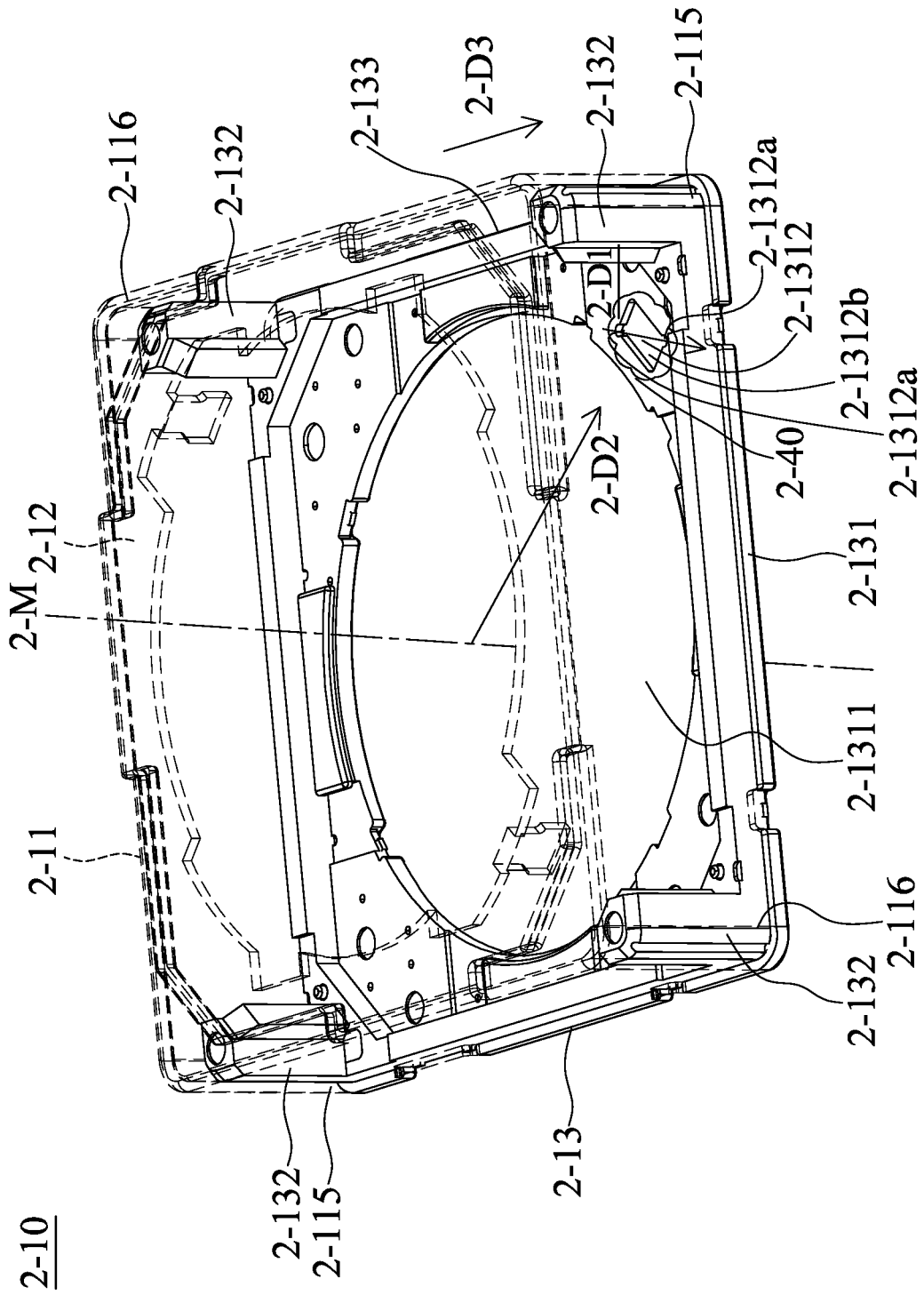
FIG. 23 shows a perspective view of the fixed part and a adhering element according to an embodiment of the present disclosure, wherein an outer frame and a protective structure are shown as dashed lines.

Please refer to FIG. 23, FIG. 23 is a perspective view of the fixed part 2-10 and the adhering element 2-40 according to an embodiment of the present disclosure, wherein the outer frame 2-11 and the protective structure 2-12 are shown as dashed lines. As shown in FIG. 23, the bottom plate 2-13 includes a bottom plate body 2-131, four bottom plate uprights 2-132 and a fixed part side 2-133. The bottom plate body 2-131 has a bottom plate opening 2-1311 and a sensing element groove 2-1312. The bottom plate opening 2-1311 may be used to accommodate an image sensor (such as a CCD or a CMOS, not shown), wherein the image sensor may correspond to the optical element 2-110 (not shown in FIG. 23) to receive the light 2-L (not shown in FIG. 23) exited from the optical element 2-110. In some embodiments, the image sensor may be disposed outside the optical element driving mechanism 2-100 either, and the image sensor corresponds to the optical element 2-110 through the bottom plate opening 2-1311 of the bottom plate body 2-131. The sensing element groove 2-1312 is located at the first corner 2-115. The sensing element groove 2-1312 includes two adhering element grooves 2-1312*a* and a circuit fixing groove 2-1312*b*. The arranging direction 2-D1 of the adhering element grooves 2-1312*a* is different than the radial direction 2-D2 that extends radially around the main axis 2-M. Moreover, the arranging direction 2-D1 is also different than the side extending direction 2-D3 that is parallel to the fixed part side 2-133. Thus, the space of bottom plate body 2-131 is effectively used, and the effect of miniaturization of the optical element driving mechanism 2-100 is achieved. The adhering element grooves 2-1312*a* may be filled with the adhering element 2-40 to fix the sensing assembly 2-50 (refer to FIG. 32). The circuit fixing groove 2-1312*b* may fix the circuit assembly 2-60 (refer to FIG. 32) to prevent the circuit assembly 2-60 from sliding on the bottom plate body 2-131. The four bottom plate uprights 2-132 are respectively located at the two first corners 2-115 and the two second corners 2-116, and the bottom plate uprights 2-132 extend upwardly from the bottom plate body 2-131 along the main axis 2-M.

Figure 24:
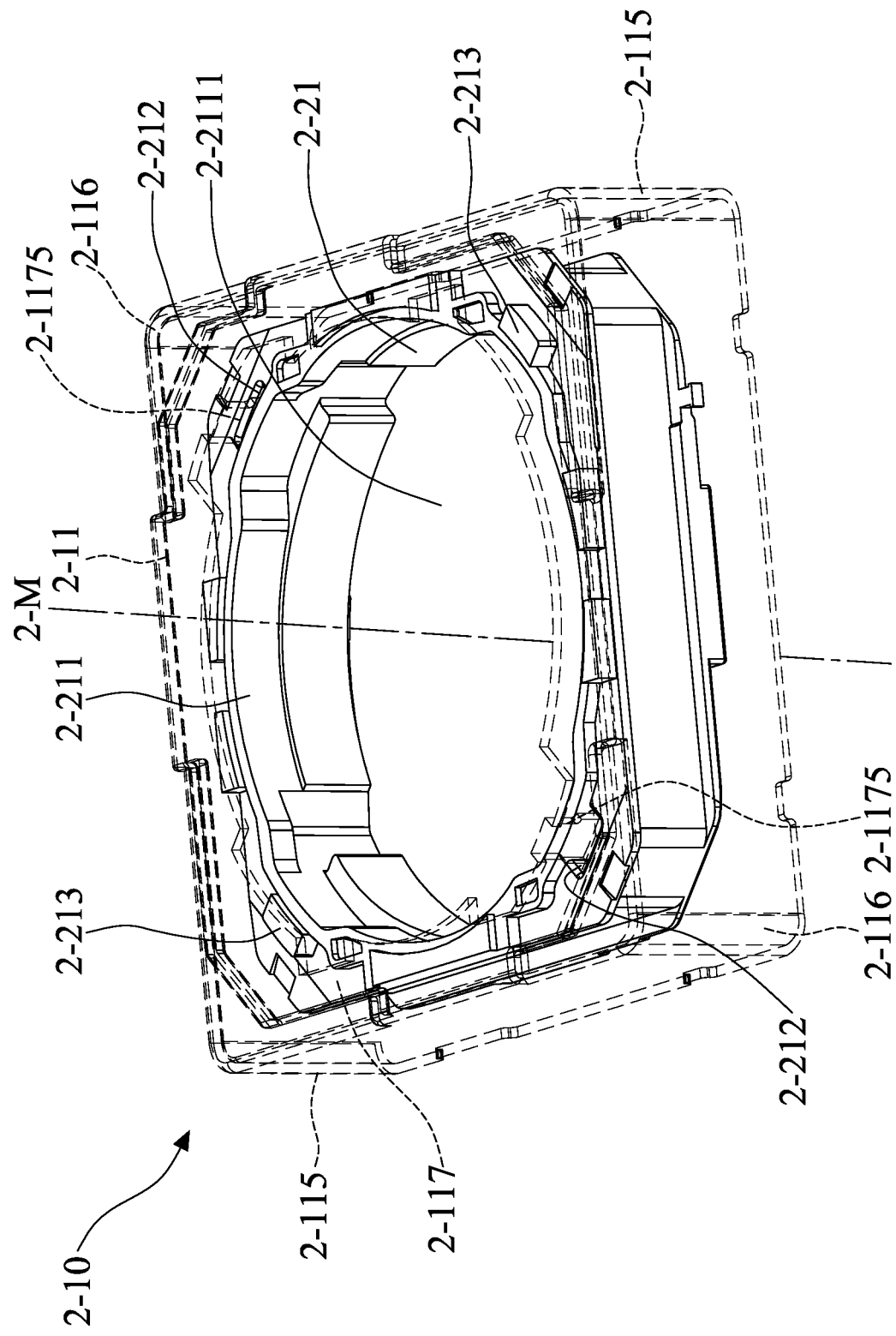
FIG. 24 shows a perspective view of the outer frame and a holder according to an embodiment of the present disclosure, wherein the outer frame is shown as a dashed line.

Please refer to FIG. 24, FIG. 24 is a perspective view of the outer frame 2-11 and the holder 2-21 according to an embodiment of the present disclosure, wherein the outer frame 2-11 is shown as a dashed line. As shown in FIG. 24, the holder 2-21 of the movable part 2-20 includes a holder body 2-211, two extension portion grooves 2-212 and two stopping portions 2-213. The holder body 2-211 has a hollow annular structure and has a through hole 2-2111, the through hole 2-2111 may accommodate the optical element 2-110 (not shown in FIG. 24). The extension portion grooves 2-212 are formed on the holder body 2-211, and the extension portion grooves 2-212 respectively correspond to the second corners 2-116. That is, the extension portion grooves 2-212 are adjacent to the second corners 2-116, and the distances between the extension portion grooves 2-212 and the second corners 2-116 are smaller than the distances between the extension portion grooves 2-212 and the first corners 2-115. The extension portion grooves 2-212 are recessed downwardly from the holder body 2-211, so as to accommodate a portion of the extension portions 2-1175. Thus, the extension portions 2-1175 may be in contact with the extension portion grooves 2-212 to restrict the movement of the holder 2-21 relative to the fixed part 2-10 when the holder 2-21 is impacted. Specifically, by providing the extension portions 2-1175 and the extension portion grooves 2-212, the rotation of the holder 2-21 relative to the fixed part 2-10 may be avoided, thereby the effect of anti-twisting is achieved. The stopping portions 2-213 are formed on the holder body 2-211, and the stopping portions 2-213 protrude upwardly from the holder body 2-211. Thus, the stopping portions 2-213 may be in contact with the outer frame top 2-117 to restrict the movement of the holder 2-21 relative to the fixed part 2-10 when the holder 2-21 is impacted. Specifically, the stopping portions 2-213 may restrict the upward movement of the holder 2-21 along the main axis 2-M relative to the fixed part 2-10. The stopping portions 2-213 respectively correspond to the first corners 2-115 where no extension portions 2-1175 are provided. That is, the stopping portion 2-213 is adjacent to the first corner 2-115, and the distances between the stopping portions 2-213 and the first corners 2-115 are smaller than the distances between the stopping portions 2-213 and the second corners 2-116.

Figure 25:
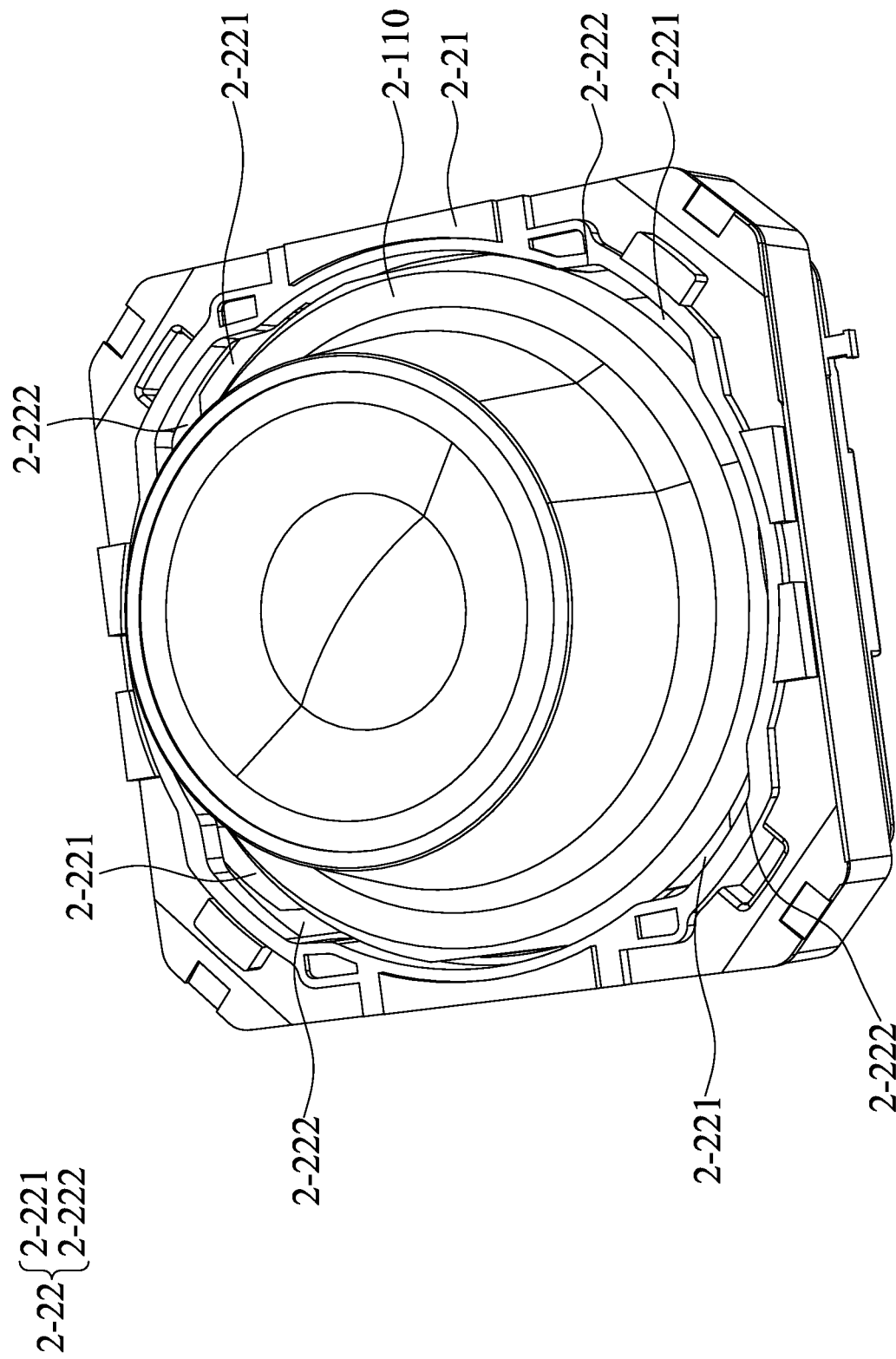
FIG. 25 shows a perspective view of the holder, a positioning structure and the optical element according to an embodiment of the present disclosure.

Please refer to FIG. 25, FIG. 25 is a perspective view of the holder 2-21, the positioning structure 2-22 and the optical element 2-110 according to an embodiment of the present disclosure. As shown in FIG. 25, the positioning structure 2-22 of the movable part 2-20 includes four positioning blocks 2-221 and four positioning holes 2-222. The positioning blocks 2-221 are disposed on the optical element 2-110, and the four positioning blocks 2-221 may be respectively inserted into the four positioning holes 2-222. In some embodiments, the positioning blocks 2-221 may be integrally formed with the optical element 2-110, so as to improve the structural strength of the positioning blocks 2-221 and the optical element 2-110, and preventing the positioning blocks 2-221 from separating from the optical element 2-110.

Figure 26:
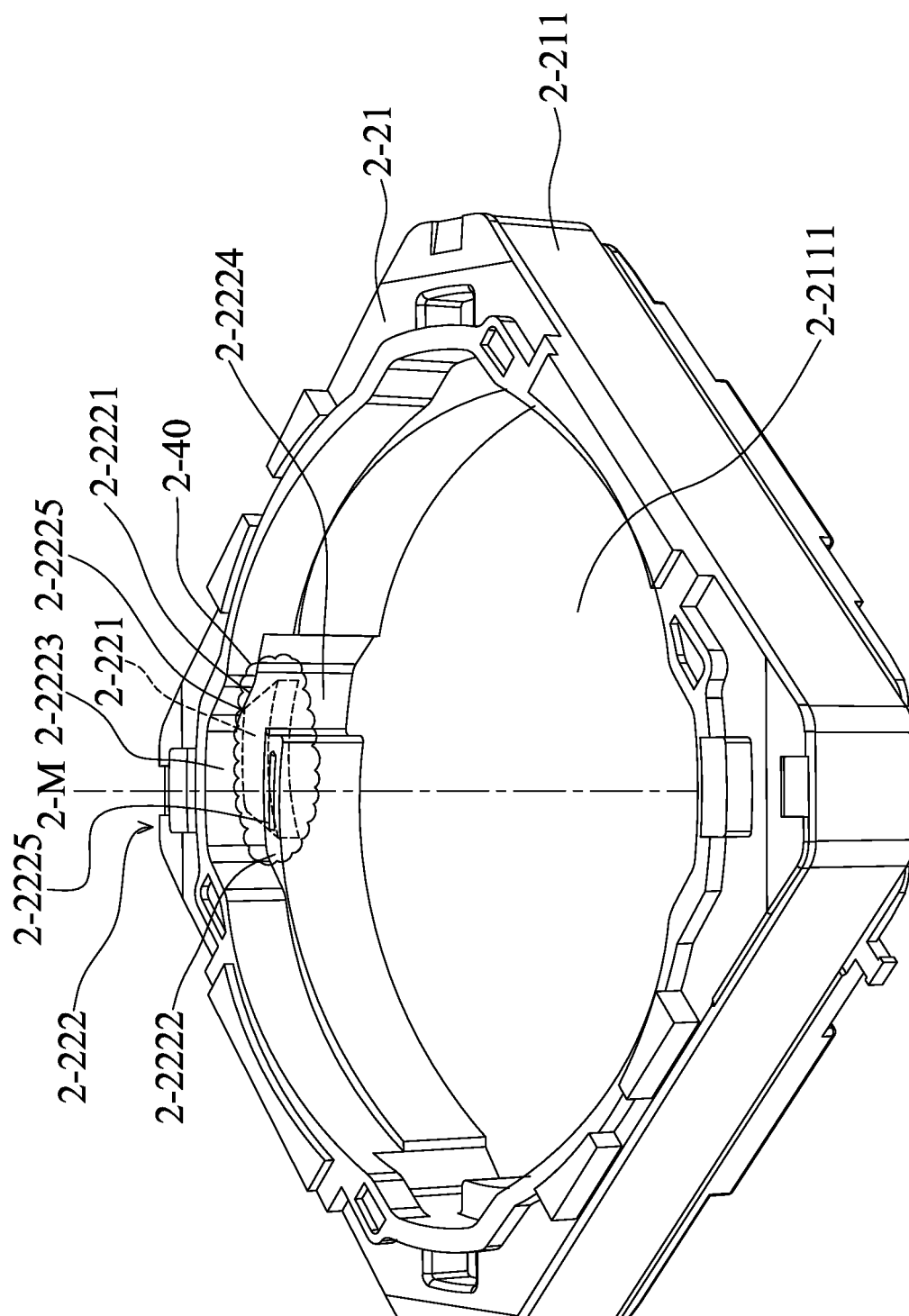
FIG. 26 shows a perspective view of the holder, one positioning structure and the adhering element according to an embodiment of the present disclosure.

Please refer to FIG. 26, FIG. 26 is a perspective view of the holder 2-21, one positioning structure 2-22 and the adhering element 2-40 according to an embodiment of the present disclosure. It should be noted that FIG. 26 is only an example, although FIG. 26 only shows one positioning structure 2-22, the number of positioning structures 2-22 is not limited to this. As shown in FIG. 26, the positioning hole 2-222 is formed on the holder body 2-211, and more specifically, the positioning hole 2-222 is formed in the through hole 2-2111 of the holder body 2-211. The positioning hole 2-222 includes an upper positioning wall 2-2221, a lower positioning wall 2-2222, an upper positioning channel 2-2223, a lower positioning channel 2-2224, and at least one positioning protrusion 2-2225. The upper positioning wall 2-2221 corresponds to the lower positioning channel 2-2224. That is, the upper positioning wall 2-2221 at least partially overlaps the lower positioning channel 2-2224 when viewed along the main axis 2-M. The lower positioning wall 2-2222 corresponds to the upper positioning channel 2-2223. That is, the lower positioning wall 2-2222 at least partially overlaps the upper positioning channels 2-2223 when viewed along the main axis 2-M.

As shown in FIG. 26, in this embodiment, the positioning block 2-221 (shown as a dashed line) may pass through the upper positioning channel 2-2223, and after being in contact with the lower positioning wall 2-2222, the optical element 2-110 (not shown in FIG. 26) is rotated clockwise, so that the positioning block 2-221 is in contact with the lower positioning wall 2-2222 and the upper positioning wall 2-2221 at the same time, and the positioning block 2-221 is located between the upper positioning wall 2-2221 and the lower positioning wall 2-2222. In other embodiments, due to the different configurations of the positioning hole 2-222, the positioning block 2-221 may pass through the upper positioning channel 2-2223, and after the positioning block 2-221 being in contact with the lower positioning wall 2-2222, the optical element 2-110 is rotated counterclockwise, so that the positioning block 2-221 is in contact with the lower positioning wall 2-2222 and the upper positioning wall 2-2221 at the same time, and the positioning block 2-221 is located between the upper positioning wall 2-2221 and the lower positioning wall 2-2222. Since the positioning block 2-221 is in contact with the upper positioning wall 2-2221 and the lower positioning wall 2-2222 at the same time, the optical element 2-110 is affixed to the holder 2-21. The positioning structure of the present invention may allow to provide no screw structure to the optical element 2-110 or the through hole 2-2111 of the holder body 2-211. Thus, the volume of the holder body 2-211 may be reduced. In other words, the positioning structure of the present invention may miniaturize the optical element driving mechanism 2-100.

As shown in FIG. 26, the positioning protrusions 2-2225 may be formed on the upper positioning wall 2-2221 and the lower positioning wall 2-2222. The positioning protrusion 2-2225 formed on the upper positioning wall 2-2221 protrudes downwardly from the upper positioning wall 2-2221 along the main axis 2-M, and the positioning protrusion 2-2225 formed on the lower positioning wall 2-2222 protrudes upwardly from the lower positioning wall 2-2222 along the main axis 2-M. The positioning protrusions 2-2225 may make the positioning block 2-221 abut the upper positioning wall 2-2221, the lower positioning wall 2-2222 and the positioning protrusions 2-2225 more effectively, so that the optical element 2-110 is affixed to the holder 2-21 more stably. However, it should be noted that, in other embodiments, the positioning projection 2-2225 may only be formed on the upper positioning wall 2-2221 or on the lower positioning wall 2-2222. Furthermore, the positioning hole 2-222 may be provided with the adhering element 2-40 to fix the positioning block 2-221 to the upper positioning wall 2-2221 and the lower positioning wall 2-2222 more stably. It should be noted that the adhering element 2-40 used here may be glue or the like. Moreover, the positioning structure of the present invention may allow using less adhering element 2-40 to achieve a better fixing effect. Thus, the weight of the optical element driving mechanism 2-100 may be reduced. In other words, the positioning structure of the present invention may miniaturize the optical element driving mechanism 2-100.

Figure 27:
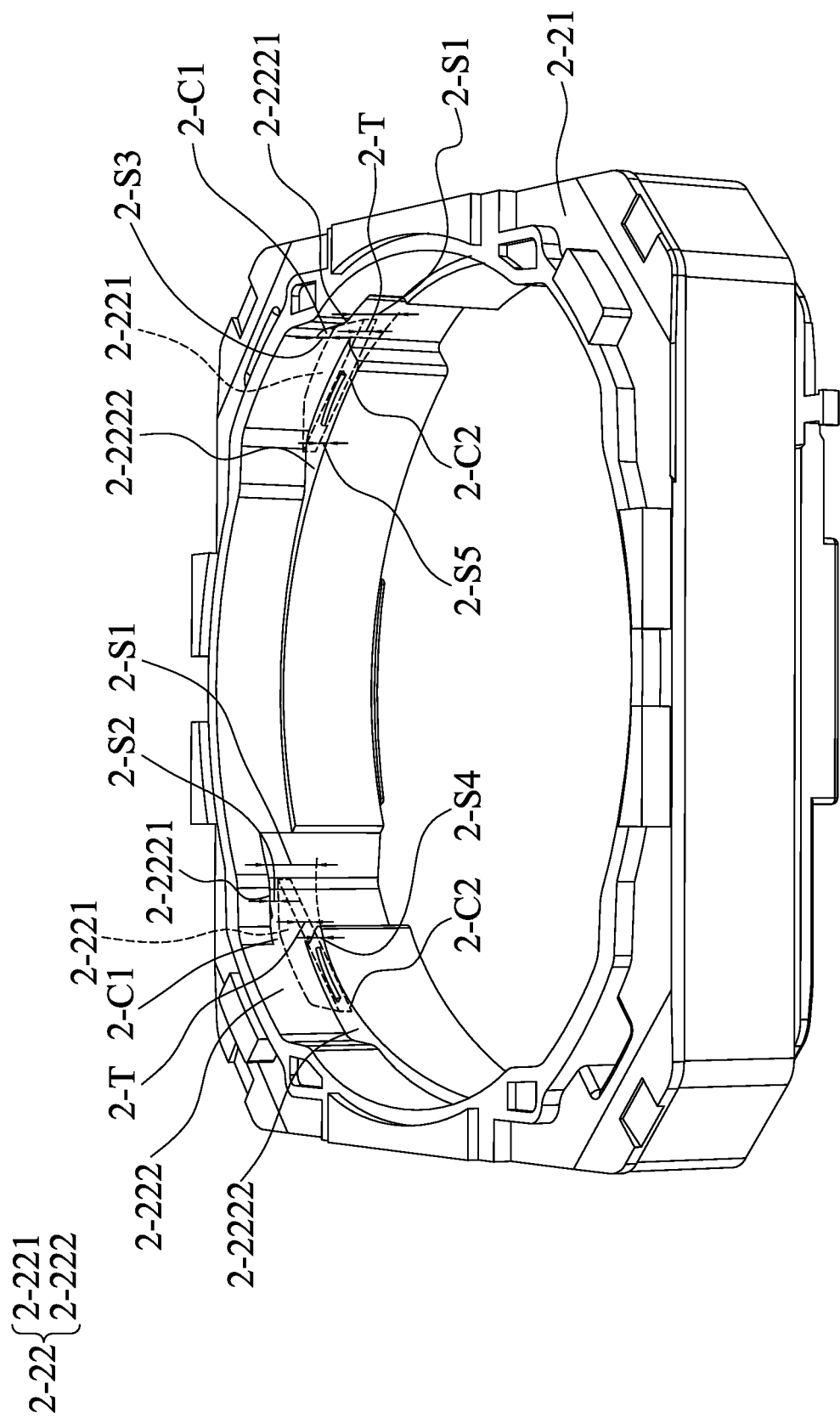
FIG. 27 shows a perspective view of the holder and the positioning structure according to an embodiment of the present disclosure.

Please refer to FIG. 27. FIG. 27 is a perspective view of the holder 2-21 and the positioning structure 2-22 according to an embodiment of the present disclosure. As shown in FIG. 27, if the tolerances in process and human operations are taken in to consideration, the positioning blocks 2-221 (shown as a dashed line) of the positioning structures 2-22 may not abut the upper positioning walls 2-2221 or the lower positioning walls 2-2222 of the positioning holes 2-222. That is, gaps 2-C1 may exist between the positioning blocks 2-221 and the upper positioning walls 2-2221, gaps 2-C2 may exist between the positioning blocks 2-221 and the lower positioning walls 2-2222, or the gaps 2-C1 may exist between the positioning blocks 2-221 and the upper positioning walls 2-2221 and the gaps 2-C2 may exist between the positioning blocks 2-221 and the lower positioning walls 2-2222 at the same time. That is, the shortest distance 2-S1 between the upper positioning wall 2-2221 and the lower positioning wall 2-2222 is greater than the thickness 2-T of the positioning block 2-221. Furthermore, the gaps 2-C1 between each of the positioning blocks 2-221 and the corresponding upper positioning wall 2-2221 may be different sizes. For example, the shortest distance 2-S2 between one of the positioning blocks 2-221 and the corresponding upper positioning wall 2-2221 is different than the shortest distance 2-S3 between another positioning block 2-221 and the corresponding upper positioning wall 2-2221. Likewise, the size of the gaps 2-C2 between each of the positioning blocks 2-221 and the corresponding lower positioning wall 2-2222 may be different. For example, the shortest distance 2-S4 between one of the positioning blocks 2-221 and the corresponding lower positioning wall 2-2222 is different than the shortest distance 2-S5 between another positioning block 2-221 and the corresponding lower positioning wall 2-2222.

Figure 28:
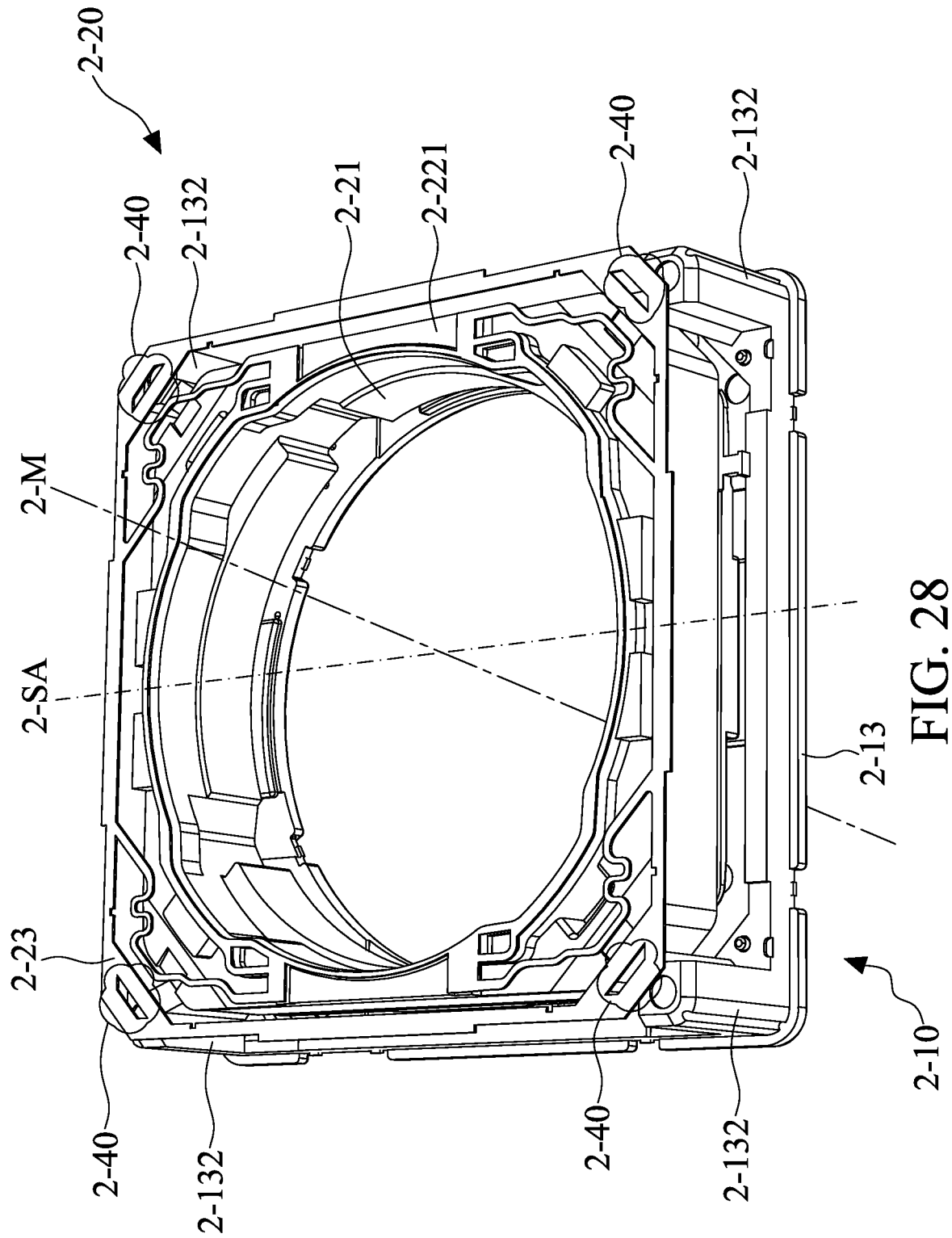
FIG. 28 shows a perspective view of a bottom plate, the holder, an upper spring and the adhering element according to an embodiment of the present disclosure.
Figure 29:
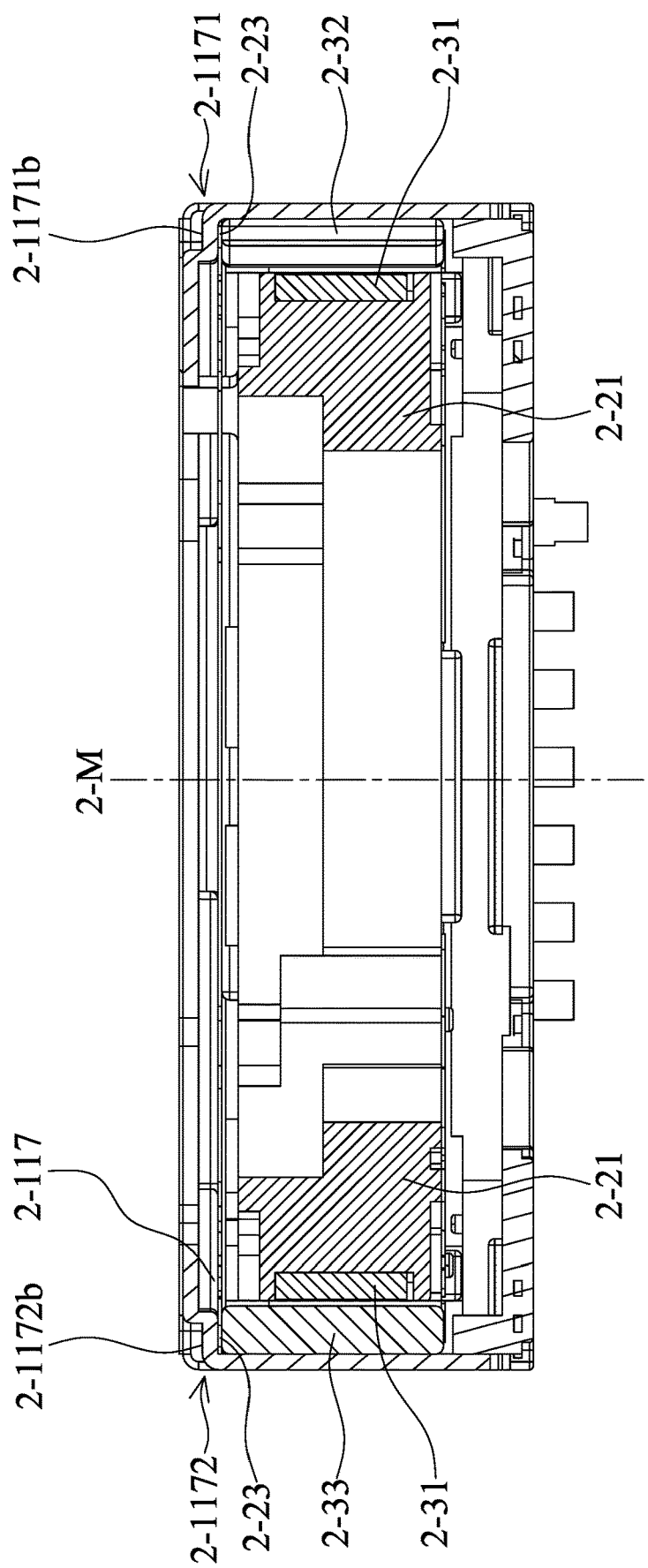
FIG. 29 shows a cross-sectional view of the optical element driving mechanism along line 2-A-2-A of FIG. 21, according to an embodiment of the present disclosure.

Please refer to FIGS. 28 and 29. FIG. 28 is a perspective view of the bottom plate 2-13, the holder 2-21, the upper spring 2-23 and the adhering element 2-40 according to an embodiment of the present disclosure. FIG. 29 shows a cross-sectional view of the optical element driving mechanism 2-100 along line 2-A-2-A of FIG. 21, according to an embodiment of the present disclosure. As shown in FIGS. 28 and 29, the upper spring 2-23 of the movable part 2-20 connects the holder 2-21 to the fixed part 2-10. Moreover, the upper spring 2-23 is also in contact with the first end recesses 2-1171*b* of the first recessed portions 2-1171 of the outer frame top 2-117 and the second end recesses 2-1172*b* of the second recessed portions 2-1172 of the frame top surface 2-117. The upper spring 2-23 may elastically deform along the main axis 2-M, so that the holder 2-21 and the optical element 2-110 (not shown in FIGS. 28 and 29) fixed therein may move relative to the fixed part 2-10. Specifically, the upper spring 2-23 is connected to the holder body 2-211 and the bottom plate uprights 2-132 of the bottom plate 2-13 by the adhering element 2-40, and the adhering element 2-40 used here may be glue, solder or the like. The upper spring 2-23 is mirror symmetric when viewed along the main axis 2-M. That is, the upper spring 2-23 is at least mirror symmetric with respect to a symmetrical axis 2-SA that is perpendicular to the main axis 2-M. Thus, the elastic force of the upper spring 2-23 is balanced, so that the imbalance movement of the holder 2-21 is avoided, and the holder 2-21 is centered with respect to the fixed part 2-10.

Figure 30:
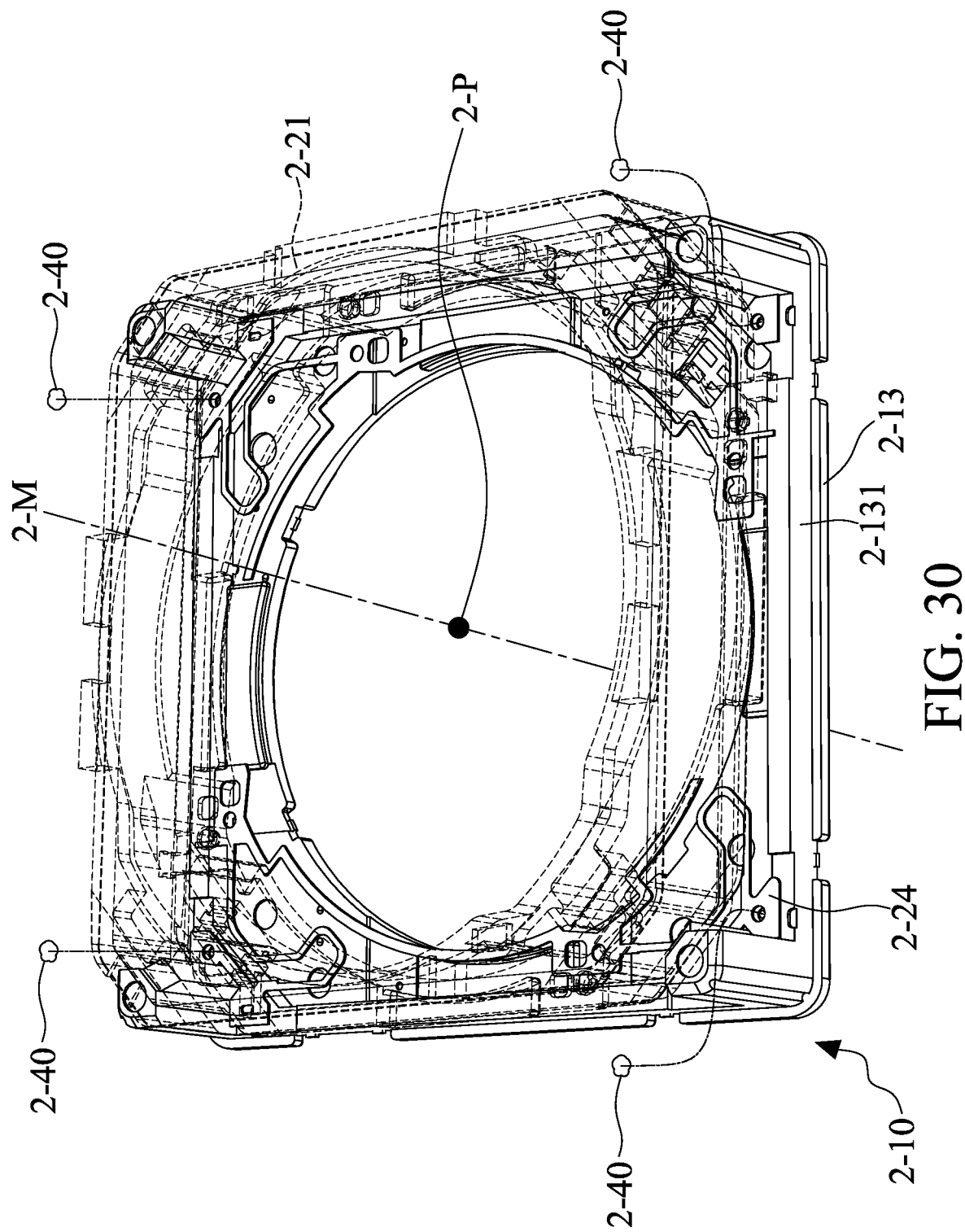
FIG. 30 shows a perspective view of the bottom plate, the holder, a lower spring and the adhering element according to an embodiment of the present disclosure, wherein the holder is shown as a dashed line.

Please refer to FIG. 30. FIG. 30 is a perspective view of the bottom plate 2-13, the holder 2-21, the lower spring 2-24 and the adhering element 2-40 according to an embodiment of the present disclosure, wherein the holder 2-21 is shown as a dashed line. As shown in FIG. 30, the lower spring 2-24 of the movable part 2-20 connects the holder 2-21 to the fixed part 2-10, and the lower spring 2-24 may elastically deform along the main axis 2-M, so that the holder 2-21 and the optical element 2-110 (not shown in FIG. 30) fixed therein may move relative to the fixed part 2-10. Specifically, the lower spring 2-24 is connected to the holder body 2-211 and the bottom plate body 2-131 of the bottom plate 2-13 by the adhering element 2-40, and the element 2-40 used here may be glue, solder or the like. The lower spring 2-24 is rotationally symmetric when viewed along the main axis 2-M. That is, the lower spring 2-24 is at least rotationally symmetric with respect to a symmetrical point 2-P that is penetrated by the main axis 2-M. Thus, the elastic force of the lower spring 2-24 is balanced, so that the imbalance movement of the holder 2-21 is avoided, and the holder 2-21 is centered with respect to the fixed part 2-10. Moreover, the rotationally symmetric lower spring 2-24 takes up less space, and the optical element driving mechanism 2-100 may be miniaturized.

Figure 31:
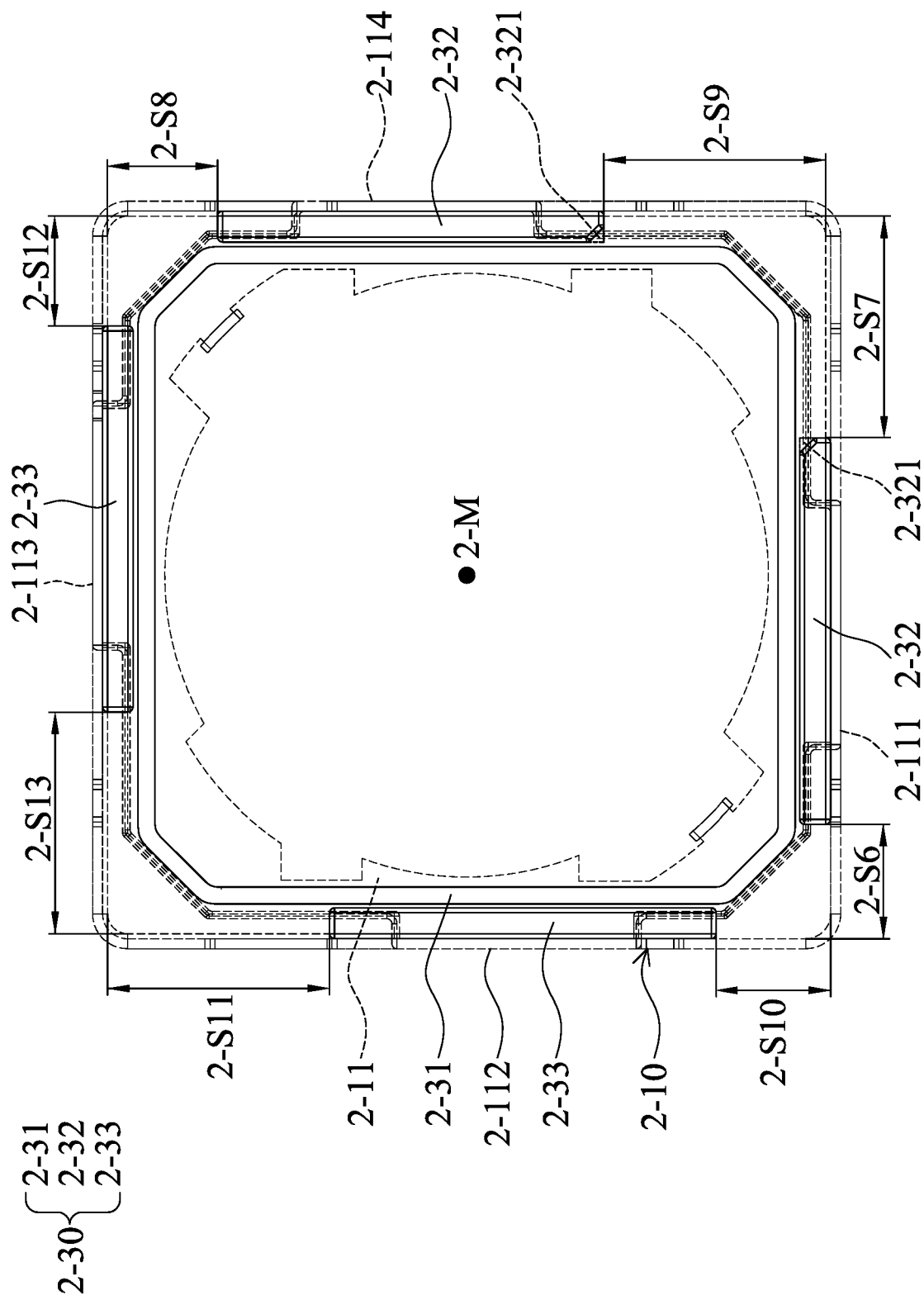
FIG. 31 shows a top view of the outer frame and a driving assembly according to an embodiment of the present disclosure, wherein the outer frame is shown as a dashed line.

Please refer to FIG. 31, FIG. 31 is a top view of the outer frame 2-11 and the driving assembly 2-30 according to an embodiment of the present disclosure, wherein the outer frame 2-11 is shown as a dashed line. The driving assembly 2-30 may drive the movable part 2-20 to move relative to the fixed part 2-10. The driving coil 2-31 is wound around the outer surface of the holder 2-21 which faces the outer frame 2-11 (may refer to FIG. 29). When an external current is applied to the driving coil 2-31, the driving coil 2-31 may interact with the magnetic field of the first driving magnets 2-32 and the second driving magnets 2-33 and generate an electromagnetic driving force to drive the holder 2-21 and the optical element 2-110 (not shown in FIG. 31) to move along the main axis 2-M relative to the fixed part 2-10.

As shown in FIG. 31, the two first driving magnets 2-32 are respectively disposed on the first wall 2-111 and the fourth wall 2-114 of the outer frame 2-11. The first driving magnet 2-32 on the first wall 2-111 is adjacent to the second wall 2-112, and the first driving magnet 2-32 on the fourth wall 2-114 is adjacent to the third wall 2-113. That is, the shortest distance 2-S6 between the first driving magnet 2-32 on the first wall 2-111 and the second wall 2-112 is shorter than the shortest distance 2-S7 between this first driving magnet 2-32 and the fourth wall 2-114. The shortest distance 2-S8 between the first driving magnet 2-32 on the fourth wall 2-114 and the third wall 2-113 is shorter than the shortest distance 2-S9 between this first driving magnet 2-32 and the first wall 2-111.

Please refer to FIG. 29, the first driving magnets 2-32 are in contact with the upper spring 2-23. The first end recesses 2-1171*b* of the first recessed portions 2-1171 of the outer frame top 2-117 at least partially overlap the upper spring 2-23 and the first driving magnets 2-32 when viewed along the main axis 2-M; moreover, the second end recesses 2-1172*b* of the second recessed portions 2-1172 of the outer frame top 2-117 at least partially overlap the upper spring 2-23 and the first driving magnets 2-32 when viewed along the main axis 2-M as well (not shown).

Please refer to FIG. 31, since the outer frame 2-11 is made of a metal with magnetic conductivity, the outer frame 2-11 may concentrate the magnetic field of the first driving magnets 2-32, thereby enhancing the magnetic force of the first driving magnets 2-32. The first driving magnet 2-32 has a cut portion 2-321 (shown as a dashed line). Therefore, the first driving magnets 2-32 are not rectangles when viewed along the main axis 2-M. In this embodiment, the cut portions 2-321 are triangles. However, in other embodiments, the cut portions 2-321 may have any suitable shapes, such as polygons or arcs. The cut portion 2-321 of the first driving magnet 2-32 on the first wall 2-111 is located at one end of this first driving magnet 2-32 that is close to the fourth wall 2-114; the cut portion 2-321 of the first driving magnet 2-32 on the fourth wall 2-114 is located at one end of this first driving magnet 2-32 that is close to the first wall 2-111. Moreover, the cut portions 2-321 are adjacent to the sensing element 2-50 (may refer to FIG. 32) to reduce the influence on the sensing element 2-50.

Please continue referring to FIG. 31, the two second driving magnets 2-33 are respectively disposed on the second wall 2-112 and the third wall 2-113 of the outer frame 2-11. The second driving magnet 2-33 on the second wall 2-112 is adjacent to the first wall 2-111, and the second driving magnet 2-33 on the third wall 2-113 is adjacent to the fourth wall 2-114. That is, the shortest distance 2-S10 between the second driving magnet 2-33 on the second wall 2-112 and the first wall 2-111 is shorter than the shortest distance 2-S11 between this second driving magnet 2-33 and the third wall 2-113. The shortest distance 2-S12 between the second driving magnet 2-33 on the third wall 2-113 and the fourth wall 2-114 is shorter than the shortest distance 2-S13 between this second driving magnet 2-33 and the second wall 2-112.

Please refer to FIG. 29 again, the second driving magnets 2-33 are in contact with the upper spring 2-23. The first end recesses 2-1171*b* of the first recessed portions 2-1171 of the outer frame top 2-117 at least partially overlap the upper spring 2-23 and the second driving magnets 2-33 when viewed along the main axis 2-M; moreover, the second end recesses 2-1172*b* of the second recessed portions 2-1172 of the outer frame top 2-117 at least partially overlap the upper spring 2-23 and the second driving magnets 2-33 when viewed along the main axis 2-M as well (not shown).

Please refer to FIG. 31 again, since the outer frame 2-11 is made of a metal with magnetic conductivity, the outer frame 2-11 may concentrate the magnetic field of the second driving magnets 2-33, thereby enhancing the magnetic force of the second driving magnets 2-33. The second driving magnets 2-33 do not have cut portions. That is, the second driving magnets 2-33 are substantially rectangles when viewed along the main axis 2-M.

Figure 32:
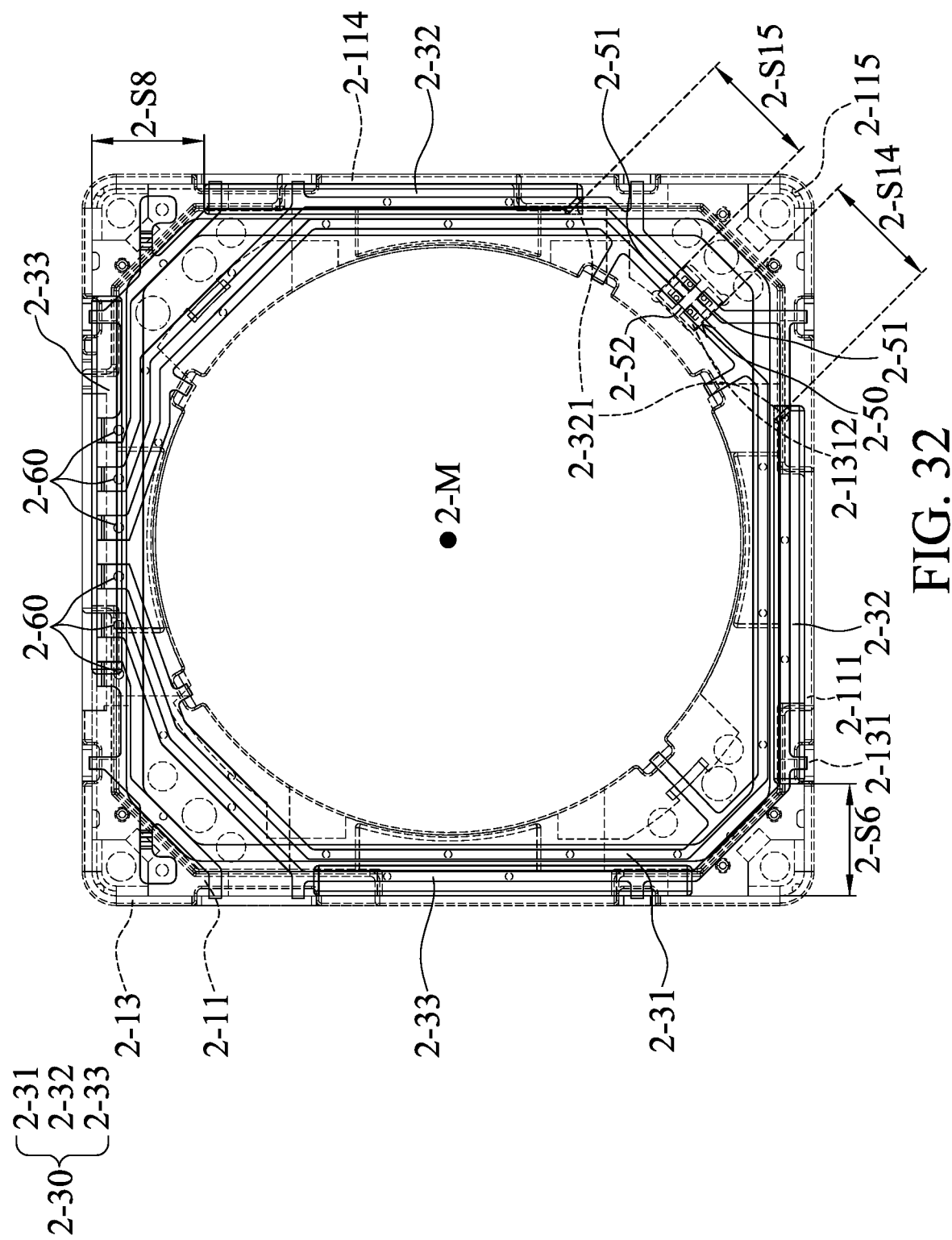
FIG. 32 shows a top view of the outer frame, the bottom plate, the driving assembly, a sensing assembly and a circuit assembly according to an embodiment of the present disclosure, wherein the outer frame and the bottom plate are shown as dashed lines.

Please refer to FIG. 32, FIG. 32 is a top view of the outer frame 2-11, the bottom plate 2-13, the driving assembly 2-30, the sensing assembly 2-50 and the circuit assembly 2-60 according to an embodiment of the present disclosure, wherein the outer frame 2-11 and the bottom plate 2-13 are shown as dashed lines. The sensing magnets 2-51 of the sensing assembly 2-50 may be permanent magnets, and the sensing magnets 2-51 may be disposed on the holder 2-21 (not shown) of the movable part 2-20. As shown in FIG. 32, the sensing magnets 2-51 correspond to the sensing element 2-52. That is, the sensing magnets 2-51 at least partially overlap the sensing element 2-52 when viewed along the main axis 2-M. The sensing element 2-52 is electrically connected to the circuit assembly 2-60, so that the sensing element 2-52 may detect the change in magnetic field due to the movement of the sensing magnets 2-51, so as to determine the displacement of the holder 2-21 along the main axis 2-M relative to the movable part 2-20. The sensing element 2-52 is disposed in the sensing element groove 2-1312 of the bottom plate body 2-131, that is, the sensing magnets 2-51 and the sensing element 2-52 are located at the first corner 2-115 where no extension portion 2-1175 is provided.

As shown in FIG. 32, the cut portions 2-321 are located at the ends of the first driving magnets 2-32 that are close to the sensing magnets 2-51. The first driving magnets 2-32 are closer to the sensing magnets 2-51 than the second driving magnets 2-33 are. Moreover, the shortest distance 2-S14 between the first driving magnet 2-32 on the first wall 2-111 and the sensing magnets 2-51 is longer than the shortest distance 2-S6 between this first driving magnet 2-32 and the second wall 2-112; the shortest distance 2-S15 between the first driving magnet 2-32 on the fourth wall 2-114 and the sensing magnets 2-51 is greater than the shortest distance 2-S8 between this first driving magnet 2-32 and the third wall 2-113. Thus, the influence of the first driving magnets 2-32 on the sensing magnets 2-51 may be minimized, thereby improving the sensing accuracy of the sensing assembly 2-50. The sensing element 2-52 discussed herein may be a Hall sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate.

Please continue referring to FIG. 32, the circuit assembly 2-60 is disposed in the bottom plate body 2-131 of the bottom plate 2-13. The circuit assembly 2-60 is electrically connected to the driving coil 2-31 and the sensing element 2-52 (but the driving coil 2-31 is not electrically connected to the sensing element 2-52) to provide the external current to the driving coil 2-31 and the sensing element 2-52. More specifically, the circuit assembly 2-60 is embedded in the bottom plate body 2-131. Thus, the optical element driving mechanism 2-100 may be integrally manufactured, so as to improve the structure of the optical element driving mechanism 2-100, and the number of elements required by the optical element driving mechanism 2-100 is reduced, thereby achieving the effect of miniaturization of the optical element driving mechanism 2-100.

In summary, the optical element driving mechanism 2-100 of the present invention fixes the optical element 2-110 to the holder 2-21 by the positioning structure 2-22, so as to reduce the volume and the weight of the optical element driving mechanism 2-100, and miniaturizing the optical element driving mechanism 2-100. The optical element driving mechanism 2-100 of the present invention further reduces the influence of the first driving magnets 2-32 on the sensing magnets 2-51 by providing the first driving magnets 2-32 with the cut portions 2-321 to improve the sensing accuracy of the sensing assembly 2-50.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
    an immovable part comprising a bottom;
    a movable part connected to an optical element with an optical axis, wherein the movable part is movable relative to the immovable part;
    a driving assembly driving the movable part to move relative to the immovable part;
    a sensing assembly sensing a movement of the movable part relative to the immovable part; and
    a circuit assembly comprising an embedded portion, wherein the embedded portion is embedded in and not revealed from the bottom.

2. The optical element driving mechanism as claimed in claim 1, wherein the bottom comprises:
    a base plate extending in a direction that is perpendicular to the optical axis and comprising an opening, wherein the optical axis passes through the opening; and
    a first stage disposed on the base plate.

3. The optical element driving mechanism as claimed in claim 2, wherein the sensing assembly comprises:
    a reference element comprising a plurality of magnetic poles; and
    a sensing element corresponding to the reference element, wherein the sensing element is disposed on the bottom.

4. The optical element driving mechanism as claimed in claim 3, wherein a size of the first stage in the optical axis is larger than a size of the sensing element in the optical axis.

5. The optical element driving mechanism as claimed in claim 3, further comprising an elastic element, wherein the movable part is movably connected to the immovable part via the elastic element, and the elastic element does not overlap the sensing element when viewed along the optical axis.

6. The optical element driving mechanism as claimed in claim 5, wherein part of the elastic element is disposed on the first stage.

7. The optical element driving mechanism as claimed in claim 3, wherein the driving assembly drives the movable part to move in a first direction relative to the immovable part within a range of movement, and when the movable part is within the range of movement, the reference element does not overlap the sensing element within the range of movement when viewed in a second direction that is perpendicular to the first direction.

8. The optical element driving mechanism as claimed in claim 3, wherein the bottom further comprises a second stage disposed on the base plate, the second stage is closer to the sensing element than the first stage, and a maximum size of the first stage in the optical axis is different from a maximum size of the second stage in the optical axis.

9. The optical element driving mechanism as claimed in claim 8, wherein the bottom further comprises a stopping portion, and a size of the stopping portion in the optical axis is between a size of the first stage in the optical axis and a size of the second stage in the optical axis.

10. The optical element driving mechanism as claimed in claim 8, wherein the sensing element does not protrude from the second stage when viewed in a direction that is perpendicular to the optical axis.

11. The optical element driving mechanism as claimed in claim 8, wherein a maximum size of the sensing element in the optical axis is larger than the maximum size of the second stage in the optical axis.

12. The optical element driving mechanism as claimed in claim 8, wherein the bottom further comprises a recess formed on the second stage, and the sensing element is disposed in the recess.

13. The optical element driving mechanism as claimed in claim 12, further comprising an adhesion element, wherein the bottom further comprises a concave hole formed on the recess, the adhesion element flows to the recess via the concave hole, and the adhesion element does not flow to the second stage.

14. The optical element driving mechanism as claimed in claim 3, wherein the circuit assembly further comprises a reveled portion revealed from the bottom, and the revealed portion is electrically connected to the sensing element.

15. The optical element driving mechanism as claimed in claim 14, wherein the base plate further comprises an inner surface close to the opening and an outer surface located on an outer periphery of the base plate, and part of the revealed portion of the circuit assembly is revealed from the inner surface and the outer surface.

16. The optical element driving mechanism as claimed in claim 14, wherein the bottom further comprises a trench receiving part of the revealed portion of the circuit assembly.

17. The optical element driving mechanism as claimed in claim 14, further comprising an elastic element and an electrical connection element, wherein the movable part is movably connected to the immovable part via the elastic element, the electrical connection element is disposed on the elastic element, so that the elastic element is electrically connected to the circuit assembly.

18. The optical element driving mechanism as claimed in claim 17, wherein the sensing element is disposed on a first corner of the bottom while the electrical connection element is not disposed on the first corner.

19. The optical element driving mechanism as claimed in claim 14, wherein the circuit assembly surrounds the opening of the base plate when viewed along the optical axis.

20. The optical element driving mechanism as claimed in claim 19, wherein the circuit assembly comprises a first segment and a second segment located on different sides of the sensing element, part of the first segment surrounds the opening of the base plate corresponds to an arc when viewed along the optical axis, and the arc is greater than 180°.

* * * * *